United States Patent [19]

Tol et al.

[11] Patent Number: 4,829,308
[45] Date of Patent: May 9, 1989

[54] RASTER DISPLAY SYSTEM

[75] Inventors: John M. Tol, Sudbury; Anthony F. Matt, West Newton, both of Mass.

[73] Assignee: Raytheon Company, Lexington, Mass.

[21] Appl. No.: 785,362

[22] Filed: Oct. 7, 1985

[51] Int. Cl.[4] ................................................ G01S 7/44
[52] U.S. Cl. ..................................... 342/185; 342/176
[58] Field of Search ........................ 367/113; 342/176

[56] References Cited

U.S. PATENT DOCUMENTS

| | | | |
|---|---|---|---|
| 4,165,506 | 8/1979 | Brands et al. | 342/185 |
| 4,179,681 | 12/1979 | Zehner et al. | 342/185 |
| 4,383,258 | 5/1983 | Morin | 342/185 |
| 4,387,365 | 6/1983 | Berry et al. | 342/185 |
| 4,397,008 | 8/1983 | Ziese | 367/113 |
| 4,412,220 | 10/1983 | Aanstoot et al. | 342/185 |
| 4,434,422 | 2/1984 | Kenol et al. | 342/185 |
| 4,443,797 | 4/1984 | Cramp et al. | |
| 4,547,803 | 10/1985 | Richards | 342/185 |

Primary Examiner—T. H. Tubbesing
Assistant Examiner—Mark Hellner
Attorney, Agent, or Firm—Richard M. Sharkansky

[57] ABSTRACT

An echo receiving system is provided for periodically scanning a region for echo returns obtained in polar coordinates and for providing a visual display of such received echo returns in a rectangular raster format, such system comprising: a scan converter, responsive to the echo returns obtained in polar coordinates for converting such returns into rectangular coordinates; and, means for modifying such coordinate converted returns and for displaying such modified, coordinate converted returns in the rectangular raster format with displayed data being a function of the scan-to-scan change in echo returns from objects in the second region. With such arrangment, target build-up and target decay may be presented in the digitally generated raster display in a manner similar to that presented in an analog PPI display.

1 Claim, 12 Drawing Sheets

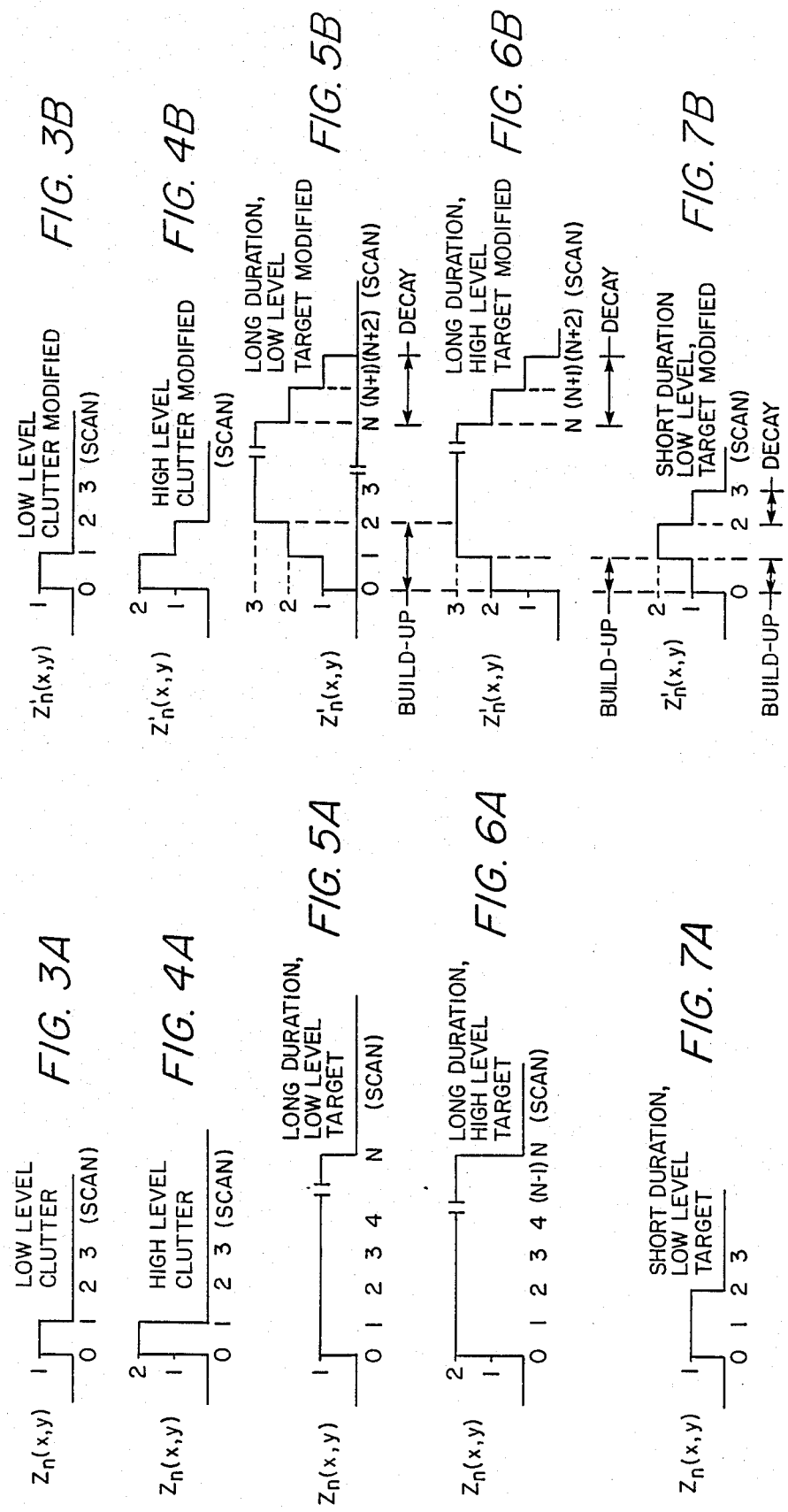

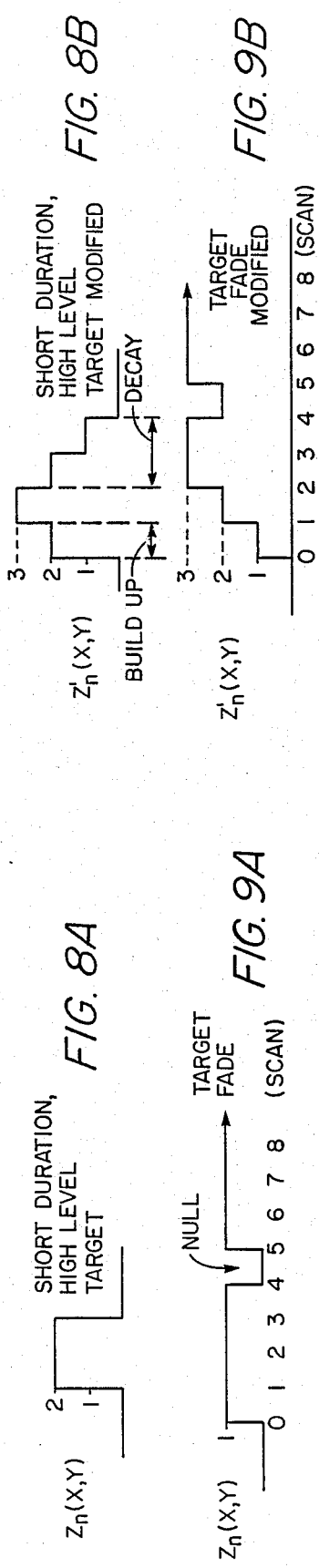
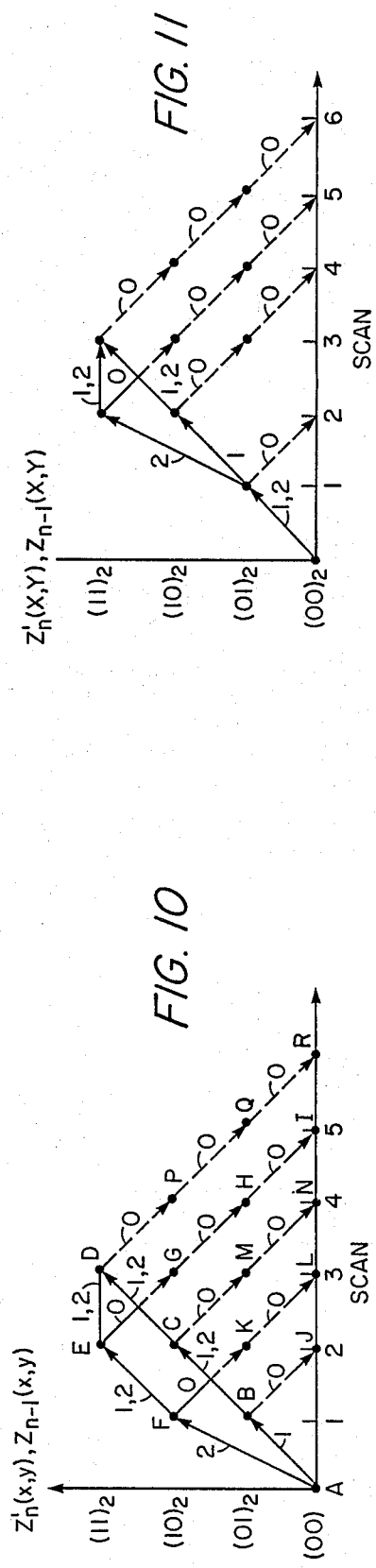

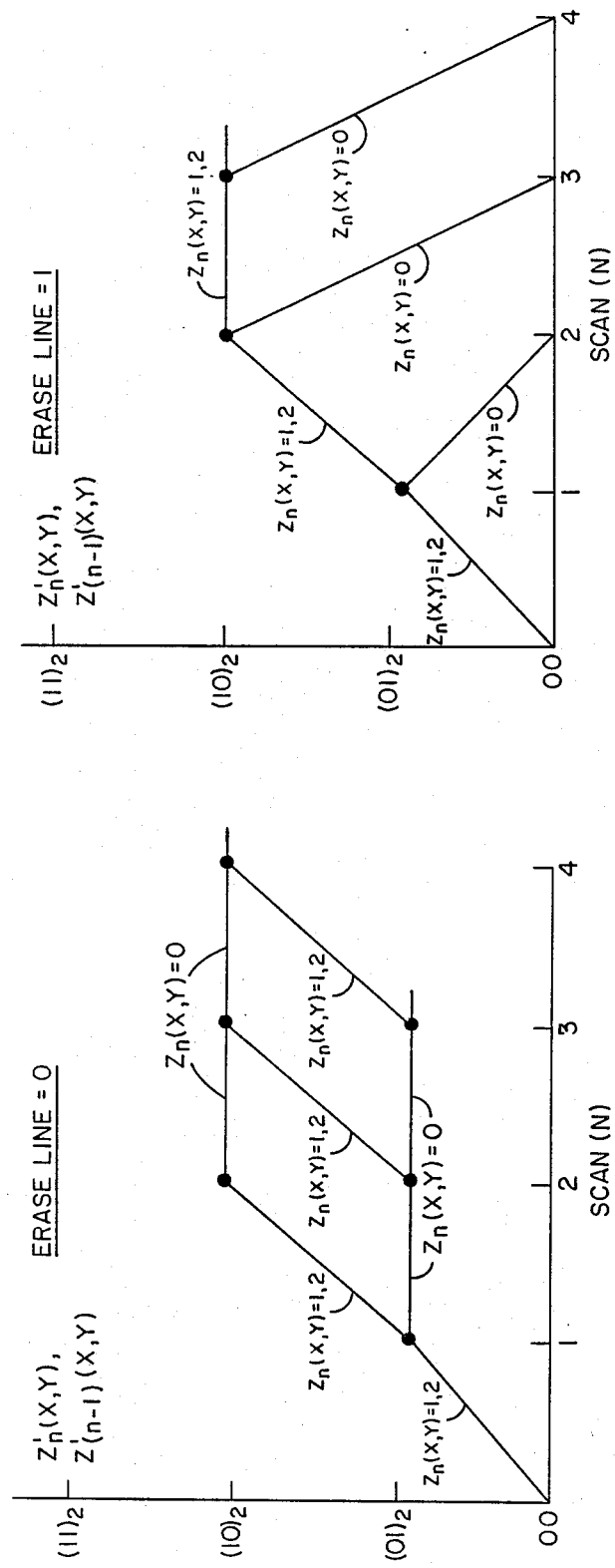
FIG. 18B
FIG. 18A
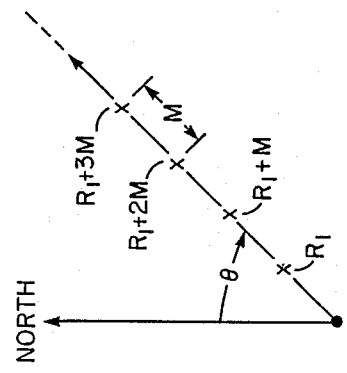
FIG. 19

RASTER DISPLAY SYSTEM

BACKGROUND OF THE INVENTION

This invention relates generally to echo receiving systems and more particularly to visual display apparatus used in such systems.

As is known in the art, echo receiving systems, such as radar and sonar systems, have been used to detect the presence of objects producing echo returns from transmitted pulses of sonic or electromagnetic radiation. In order to visually present the information in the echo return for suitable operator interpretation, a visual display system is typically provided. One type of display is a Plan Position Indicator (PPI) wherein an intensity-modulated circular map-like display on which echo signals produced by reflecting objects are shown with range and azimuth angle displayed in polar (rho-theta) coordinates. Thus, in a radar system, in response to each one of a series of transmitted pulses, a radar return signal is produced at the output of a radar receiver. The return signal is made up of a sequence of analog target returns, or range sweep, in which the time of occurrence with respect to the transmitted pulse is a measure of the target distance, or range R, and the antenna direction at the moment of transmission provides the target azimuth, $\theta$. Thus, as the transmitting antenna is scanned in azimuth, transmitted pulses are sent out with the result that a plurality of range sweeps of echo returns are produced, each one of such sweeps being at a correspondingly different azimuth angle. Thus, as the antenna scans in azimuth, echo returns from objects at various ranges at each azimuth are displayed on the display screen, typically a cathode ray tube (CRT). As described in Chapter 9 of *Introduction to Radar Systems* (Second Edition) by Merrill I. Skolnick, McGraw Hill Book Company (1980), the decay of the visual information displayed on the CRT should be long enough to allow the operator not to miss target detections, yet short enough not to allow the information painted on one scan to interfere with new information entered from the succeeding scan. However, there is usually not sufficient flexibility available to the CRT designer to always obtain the desired phosphor decay characteristics. The brilliance of the initial "flash" from the CRT phosphor may be high, but the afterglow is dim so that it is often necessary to carefully control the color and the intensity of the ambient lighting to achieve optimum seeing conditions. The conventional CRT usually requires a darkened room or the use of a viewing hood by the operator. Thus, as is known in the art, PPI type displays operate with relatively low intensity display screens and thus typically must operate under low level lighting conditions. There are applications where it is not practical to use a CRT display which requires a darkened environment such as in the cockpit of an aircraft or an air field control tower. In order to provide a rho-theta map-like display of a scanned region on a higher intensity display screen, such as a rectangular raster-type, TV, CRT display, a scan converter is generally required. In a simple form, the output of a normal PPI display is read out by a television camera in a rectangular row-column raster scan and is then displayed on a conventional TV raster monitor. The conversion of the radial rho (i.e. range)-theta (i.e. azimuth) raster of the PPI to the rectangular raster of the TV monitor represents a "scan conversion". The PPI display may be read out repetitively to produce a bright flicker-free raster display. The display is bright not only because the stored information is displayed at a sufficiently high repetition rate to appear continuous, but also because TV monitors have phosphor characteristics which result in such monitors being inherently brighter than the conventional PPI display. On the other hand, such type of scan conversion is expensive, bulky, generally has inadequate resolution, and not readily compatible with modern solid state systems. Thus, while it is desirable to retain the brightness characteristic of a TV type monitor, the use of a television camera tube is impractical.

Other types of scan converters which have been suggested include digital processing circuitry for first converting the analog echo returns into corresponding digital data. Again, the analog returns are in a rho-theta polar coordinate system. A digital scan conversion process is used to distribute the digitized data obtained in rho-theta coordinates into corresponding data in x-y rectangular coordinates so that the same map may be obtained after the x-y data is read out in a rowcolumn rectangular raster format on a TV screen monitor. Thus, the PPI data acquired in polar coordinates is transformed to data in Cartesian (rectangular) coordinates and such converted data is stored in a display memory usually referred to as a bit image memory (BIM). Each x-y location on the monitor corresponds to a specific x-y position in the memory. The location of radar video expressed in polar coordinates is transformed to Cartesian coordinates by the scan converter and determines the memory address at which to write the corresponding encoded video. As noted above, the number of memory cells in the BIM to be addressed corresponds to, on a one-to-one basis, the number of pixels, or display elements on the monitor. Thus, a 1024 line raster with 1024 pixels in the line direction requires a memory address capability of one Mega bit, while several parallel memory planes are required to present the information in colors or at different brightness levels. The appearance of the rectangular raster display, obtained by sequentially reading out successive locations of the memory, is presented to the operator slightly different from the conventional analog PPI. More particularly, whereas on the conventional analog PPI, unwanted signals, i.e. noise and clutter, usually returns of short time duration (such as sea clutter in a marine radar system), appear as relatively weak intensity signals due to the decay characteristics of the CRT screen, the rectangular raster monitor will show these unwanted signals at full strength for the duration of a scan; that is, for a full antenna revolution, typically a few seconds. On the other hand, desired signals, (i.e. targets which are characterized by returns which exist for relatively long time durations) may not appear on the display for a particular scan if during such particular scan there is a fade (or lapse) in the target return. This is because, in such case, a zero level intensity would have been stored in the memory for this "return" and will not be updated until the next antenna scan. Hence a null will appear on the monitor for the entire antenna scan unlike an analog PPI where the display of a target over a relatively long period of time (i.e. several scan cycles) increases (i.e. builds-up) the intensity on the screen and a fade (or lapse) for a short period of time will not cause a null on the next scan but merely will appear as reduced intensity because of the integration, and persistence, characteristic of the screen. More specifically, the following PPI display characteristics, to some degree realized in the analog PPI are desirable: (1) build up of target echo returns over one or more scans; (2) decay of targets over several scans; and, (3) trails on moving targets. The properties of the PPI CRT phosphors determine the extent to which a mix of desirable characteristics can be achieved at a still acceptable light output level on the PPI CRT. Trails, for instance, require a long decay time. Desirable fast target build-up and slow decay led to the use of two layer phosphors for PPI applications, however, at a less than desirable light output. In general then, each application demands its own compromise in PPI CRT phosphor selection.

SUMMARY OF THE INVENTION

In accordance with the present invention, an echo receiving system is provided for periodically scanning a region for echo returns obtained in polar coordinates and for providing a visual display of such received echo returns in a rectangular raster format, such system comprising: a scan converter, responsive to the echo returns obtained in polar coordinates for converting such returns into rectangular coordinates, such returns being produced from targets in the scanned region and clutter in such region, such targets typically echo returns over a greater number of scans than such clutter; and, means for modifying such coordinate converted returns and for displaying such modified, coordinate converted returns in the rectangular raster format with target returns being displayed with a different characteristic than clutter returns.

In a preferred embodiment of the invention, the system includes: means for periodically scanning a region in azimuth-range (i.e. polar coordinate) format for echo returns; means for collecting the echo-returns received during each scan and for converting such collected returns into a plurality of signals for display of the collected echo return signals in a rectangular row-column raster display, each one of the converted signals representing the level of the received echo-return at a corresponding raster location in the scanned region; and, means for modifying each one of the converted signals to enable display of each one of the modified signals with a characteristic related to the number of scan echo returns received from such location. More particularly, the converted signal produced from an echo return by an object at one location during one azimuth-range scan is modified by the converted echo return produced from an echo return by an object at said location during a history of previous scans. With such arrangement, because target returns are characterized as returns which typically exist for a plurality of scans whereas clutter returns exist for typically one scan, by displaying data associated with each scanned location in accordance with the history of the echo returns from such location target returns may be displayed with a characteristic (i.e. color or intensity) different from the display of clutter returns. If returns are present from scan to scan, the data is displayed with increasing intensity or color change to simulate the effect of intensity build-up on a PPI display's response to a target. After a target moves from a location, the intensity at such location is decreased (or color changed) to simulate the effect of target decay at such location on the PPI display. Further, very short fades in a target return will not produce nulls during an entire scan thus allowing a rectangular raster display to distinguish to an operator clutter from targets in a way similar to that of a PPI analog display but with the brightness associated with rectangular raster type displays.

In accordance with an additional feature of the invention, the periodically scanning means scans successive angular sectors of the region and the collecting and converting means correspondingly successively converts the polar coordinates of the echo returns in one of such sectors while collecting the polar coordinates of the echo returns for the next sector. The modifying means includes a bit image memory having a plurality of addressable locations adapted for storing the coordinate converted data representative of the intensity of the echo returns, each addressable location corresponding to a location in the scanned region. A visual display includes a visual screen made up of a plurality of pixels, each one thereof corresponding to an addressable location and hence to the raster location in the scanned region. The bit image memory is alternatively addressed by the scan converter and a display control means. During the period of time the bit image memory is addressed by the scan converter, such scan converter addresses a set of locations in the memory corresponding to the angular sector being converted and as each one of the locations in such set of locations is addressed, collected echo returns from objects in such angular sector are converted to signals to be stored in the memory. The intensity level of the signal stored in the memory locations addressed by the scan converter is read, then modified by the intensity level of the currently converted signal, and the modified data is written into the memory at the addressed location. The memory is periodically addressed by the display control means to read the modified data stored in the memory for display and, interleaved therewith, the memory is addressed by the scan converter. Data modification is interleaved with video display maximizing efficiency of the data processing. Further, the data stored in each location of the memory represents the history of echo returns at the corresponding location in the scanned region. The data is modified in a way that echo returns from objects at such locations which have produced returns over a number of scans (i.e. typically target returns) are displayed with a characteristic different from returns from objects which have produced returns over a single scan, or from scan-to-scan in a random manner (i.e. typically clutter returns). More particularly, the target "build-up" and decay characteristics of a PPI display are in effect simulated by the data modification of the present invention. Further, clutter returns may be negated by the display or shown with low intensity or particular color and a fade in one scan out of a number of scans of echos from a target echo return may remain displayed even though such fade has occurred.

BRIEF DESCRIPTION OF THE DRAWINGS

The foregoing aspects and other features of the invention are explained in the following description taken together in connection with the accompanying drawings, in which:

FIGS. 3A-9A show time histories of returns in an exemplary x,y location of the map region in FIG. 2C prior to being modified in accordance with the invention;

FIGS. 3B-9B show the effect of the data modification section of the radar system of FIG. 1 for the examples shown in FIGS. 3A-9A, respectively;

FIG. 10 is a diagram useful in understanding an algorithm used in the modification section of the radar system of FIG. 1;

FIG. 11 is an alternate algorithm which may be used in the data modification section of the radar system in FIG. 1;

FIGS. 18A-18B show algorithms used in the data modification section of FIG. 17; and FIG. 19 is a diagram useful in understanding the operation of the data modification system of FIG. 17.

DESCRIPTION OF THE PREFERRED EMBODIMENT

Figure 1:
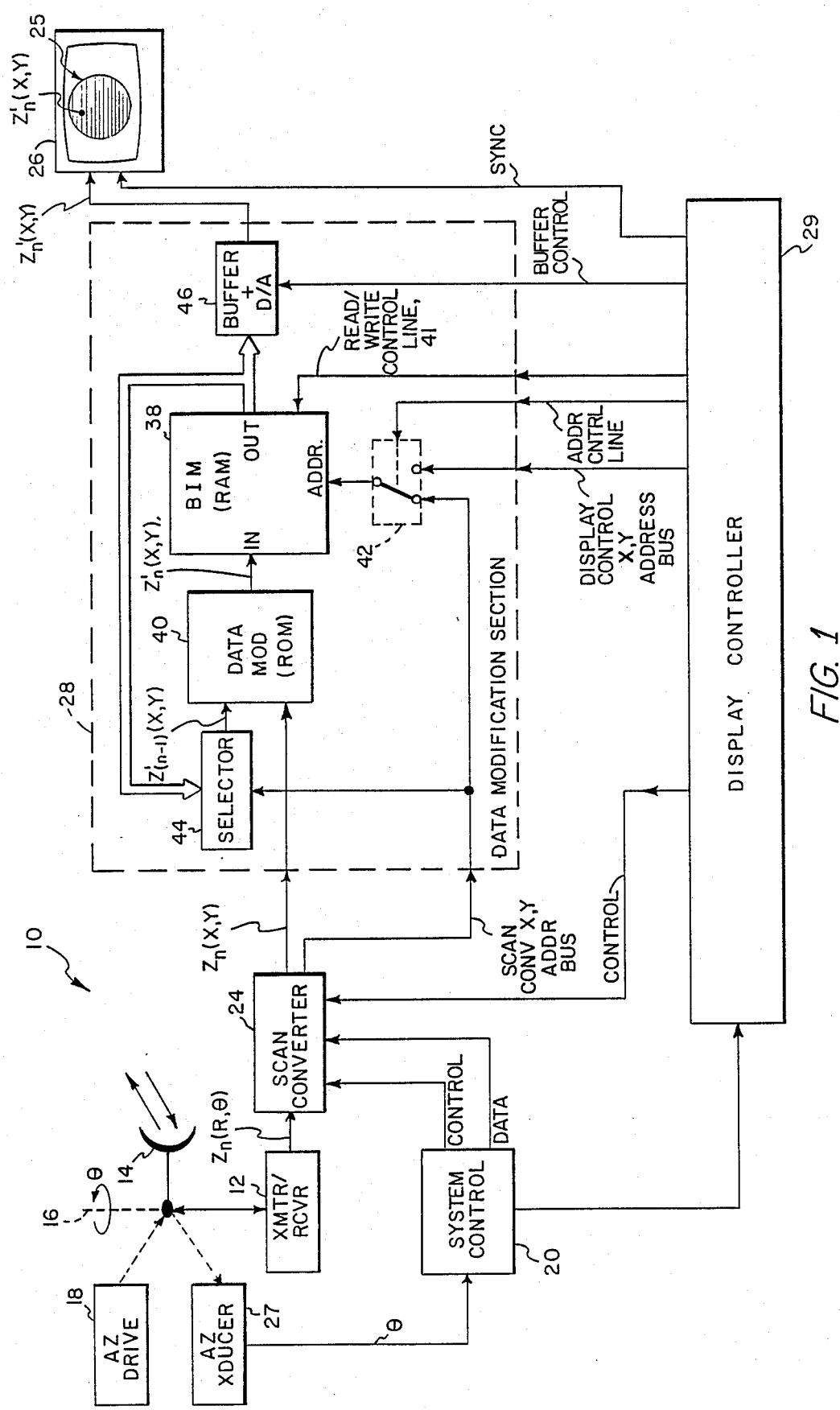
FIG. 1 is a simplified block diagram of a marine radar system according to the invention.
Figure 2C:
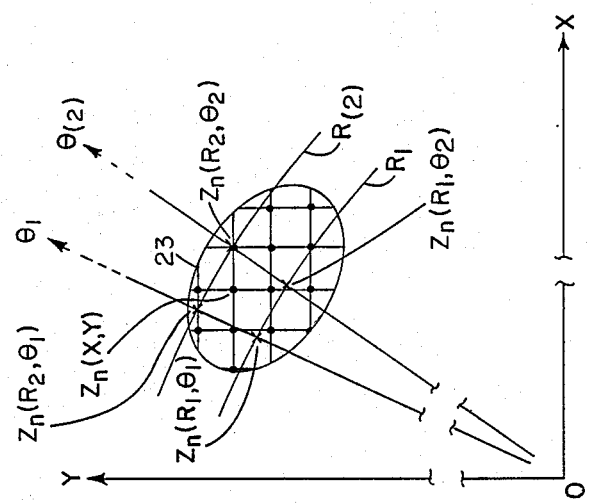
FIG. 2C shows a detailed portion of the map shown in FIG. 2B.
Figure 2B:
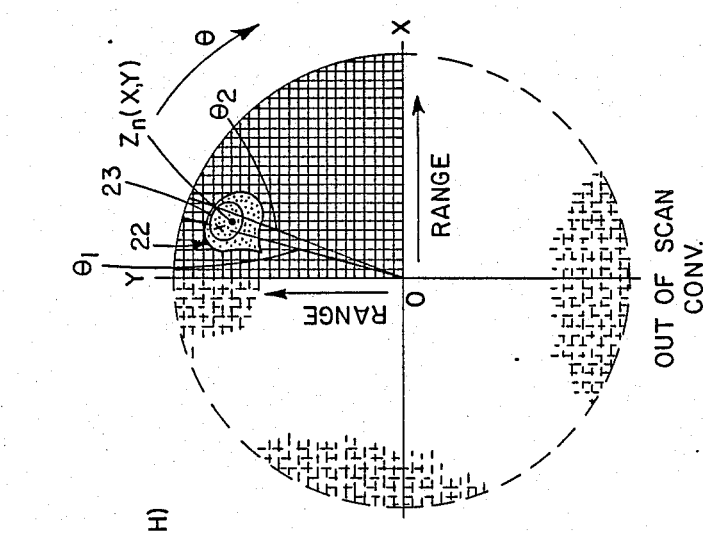
FIG. 2B is a map of the same region shown in FIG. 2A, such region being displayed in a rectangular raster format by the marine radar system of FIG. 1.
Figure 2A:
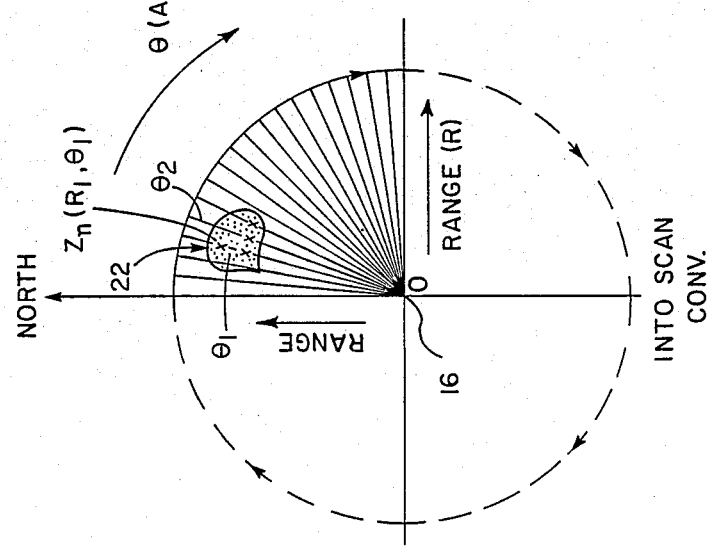
FIG. 2A is a map of a map region, such map being taken in a range-aziumuth format by the marine radar system of FIG. 1.

Referring now to FIG. 1, an echo receiving system, here a marine radar system 10 is shown to periodically scan a region for echo returns obtained in polar coordinates, as shown in FIG. 2A, for converting such returns into rectangular coordinates, as shown in FIG. 2B and for modifying the converted returns to display them in a rectangular raster format with returns displayed for each pixel in the raster being displayed in accordance with the scan-to-scan return history thereof. Thus, briefly, the system 10 includes a radar transmitter/receiver 12, coupled to an azimuth scanning antenna 14 driven to rotate about an axis 16 via scan motor 18, to periodically scan a region and produce sweeps of radar echo returns in polar (range-azimuth) format. Azimuth transducer 27 provides the azimuth direction to the system controller 20. A scan converter 24 includes the provision for collecting and storing the rho-theta echo returns and for converting the collected echo returns into data representative of the echo returns at each one of a plurality of locations defined in rectangular coordinates (x, y). Each one of the x, y coordinate locations has a corresponding picture element (pixel) location on a rectangular raster display screen 25 of TV monitor 26. Prior to display of such data, however, such data is modified by a data modification section 28 to enable display of each one of the modified signals with a characteristic related to the number of echo returns received from such location. More particularly, the converted signal produced from an echo return by an object at one location during one antenna scan revolution is modified by the converted echo return signal produced from an echo return by an object at said location during a history of previous antenna scans. With such arrangement, because target returns are characterized as returns which exist for a plurality of antenna scans, whereas clutter returns exist for typically one antenna scan, by displaying data associated with each scanned location in accordance with the history of the echo returns from such location, target returns may be displayed with a characteristic (i.e. color or intensity) different from the display of clutter returns. Further, very short fades in a target return will not produce a null during an entire scan. Still further, targets can be displayed with "build-up" and decay in a way similar to that of a PPI analog display but with the brightness associated with rectangular type raster displays. The system 10 thus includes the radar transmitter/receiver 12 coupled to the azimuth rotating antenna 14 all of conventional design and arrangement to produce pulses of radio frequency energy and, interleaved therewith, receive echo returns in response thereto from objects, i.e. sea clutter and targets (ships and land) disposed over a region periodically scanned by the antenna 14. The antenna 14 is driven to rotate in azimuth about an axis 16 via azimuth drive motor 18 mechanically coupled to the antenna 14 in a conventional manner, as indicated. The transmitter/receiver 12 transmits a pulse of energy in response to a trigger signal XMT internally produced therein. Here, antenna 14 rotates at a predetermined nominal rate of 33 rpm. Here, the pulses of radio frequency energy are transmitted at a nominal rate of 900 Hz; however, it is here noted that the rate is adjustable by an operator in a conventional manner as a function of the desired range to operate over. Here, however, the nominal rate of 900 Hz will be used to describe the system 10, it being noted that other pulse repetition frequencies may be used with suitable modification of the system 10. Finally, it should be noted that here there is no synchronization between the mechanical scanning of the antenna 14 and the pulses transmitted by the transmitter/receiver 12. In any event, however, in response to each transmitted pulse, there is an echo return from objects at locations in the scanned region such locations being at the azimuth angle $\theta$ of the antenna 14 when the pulse was transmitted, and at various ranges along such azimuth angle $\theta$. The intensity of the return (Z) is directly related to the reflectivity of the object producing such echo return as is well known. Hence, as the antenna 14 makes a complete revolution in azimuth, (i.e. scan) sufficient data is obtained from the output of the transmitter/receiver 12 to produce a map of the scanned region. It is noted, however, that the data produced by the transmitter/receiver 12 is in polar coordinates. That is, for each one of a plurality of range cells at each one of the corresponding azimuth $\theta$, there is a radar return $Z_n$ (R, $\theta$), as is shown in FIG. 2A; here such return $Z_n$ (R, $\theta$) being from a land mass 22, for example. The echo sweeps $Z_n$ (R, $\theta$) produced at the output of the transmitter/receiver 12 are fed to a scan converter 24. Scan converter 24, in response to such echo sweeps $Z_n(R, \theta)$ and timing signals produced by a system controller 20 (which provides, inter alia, control information and data produced in response to the azimuth position ($\theta$) of antenna 14 via the azimuth angle transducer 27) produces coordinate converted echo returns $Z_n(x,y)$. That is, the region being scanned may be considered as being made up of a plurality of locations, each having a position defined in a rectangular coordinate (x,y) system such as shown in FIG. 2B. Thus, the land mass 22 shown in the polar coordinate (R, $\theta$) map of FIG. 2A appears in the rectangular coordinate (x,y) map of FIG. 2B. A region 23 of the land mass 22 shown in FIG. 2B is shown enlarged in FIG. 2C. Thus, referring to FIG. 2C, it is noted that the radar transmitter/receiver 12 obtains echo returns in such region 23 at ranges $R_1$ and $R_2$ at azimuth angle $\theta_1$ and returns at such ranges $R_1$, $R_2$ at the suceeding azimuth angle $\theta$; i.e. the returns $Z_n(R_1, \theta_1)$, $Z_n(R_2, \theta_2)$, $Z_n(R_1, \theta_2)$, and $Z_n(R_2, \theta_2)$ being designated by an "X". It should next be noted that in the region 23 (FIG. 2C) there are a number of x, y locations arranged in rows and columns designated by an ".", an exemplary one thereof is designated $Z_n(x,y)$. The function of scan converter 24 is to determine the estimated echo return intensity at location x, y, such estimate being made from the collected data near the region x, y. That is, the intensity $Z_n(x, y)$ is approximated from collected echo returns $Z_n(R_1, \theta_1)$, $Z_n(R_1, \theta_2)$, $Z_n(R_2, \theta_1)$, $Z_n(R_2, \theta_2)$ for example. Here, each one of the locations corresponds to a picture element (pixel) on the display screen 25 for the rectangular raster display 26 as noted above and, as illustrated for the pixel at x,y in FIG. 1. Here display 26 has 1024 rows and 1024 columns of pixels. The basic operation of the scan converter 24 is under the control of display controller 29. While the details of controller 29 will be discussed hereinafter, suffice it to say here, however, that each revolution of the antenna 14 is divided into, here 512 regularly spaced angular sectors. The scan converter 24 correspondingly successively converts the polar coordinates of the echo returns in the previous sector while collecting data for the next sector. The data modification section 28 includes a bit image memory 38 (BIM), here a dynamic N-MOS random access memory (RAM) having a read/modify/write cycle controlled by display controller 29 via line 41. The BIM 38 has a plurality of addressable locations corresponding on a one-to-one basis to the x,y locations in the scanned region. Likewise, the display screen 25 is made up of a like plurality of pixels, each one thereof corresponding to one of the addressable locations of the BIM 38 and hence to an x,y location in the scanned region. The address terminals of BIM 38 are coupled to a multiplexer 42. Such multiplexer 42 is fed by the scan converter 24 via a scan converter x,y address bus and to the display controller 29 via a display controller x,y address bus. The multiplexer 42 is controlled by display controller 29 via an address control line to successively couple to the address terminals of the BIM 38 either an address supplied by the scan converter 24 or an address supplied by the display controller 29. During the period of time the BIM 38 is addressed by the scan converter 24, such scan converter 24 addresses a set of x, y locations in the BIM 38 disposed in the angular sector being converted and as each one of such x, y locations in such set of locations is being addressed, collected echo returns from objects within such angular sector are converted to data having a corresponding intensity level as described in connection with FIGS. 2A, 2B and 2C. Thus, the echo return intensity at each selected x, y location in the sector is converted to data representative of the effective echo returns from such location i.e. $Z_n(x,y)$ and such data is stored in such addressable location after passing through a data modification section 40 to be described. Suffice it to say here, however, that as noted above display controller 29 operates BIM 38 when such BIM 38 is addressed by the scan converter 24 in a read/modify/write cycle. Thus, BIM 38 may be considered as having the data therein initially reset to a zero condition. Thus, as the first x,y location in a converted angular sector is called out by the scan converter 24 for conversion, data stored in the BIM 38 at that x,y location is first read out of the BIM 38. The address supplied to the BIM 38 here results in the reading of 32 locations of data (i.e. 32 locations are read out from the BIM 38 in parallel for reasons to become apparent in connection with the display of data). The lower order bits of the address supplied by the scan converter 24 are fed to a selector 44 along with the 32 locations read from the BIM 38. In response to the lower order bits of the scan converter supplied address, the particular one of the 32 locations having the desired x,y location is selected. The data $Z_{n-1}(x,y)$ previously stored in the BIM 38 at this x,y location during the previous antenna scan (i.e. scan (n−1)) is used to modify the converted data $Z_n(x,y)$ of the present antenna scan (i.e. scan (n)) and thus produce a modified video data $Z_n'(x,y)$. This modified data $Z_n'(x,y)$ is then written into the same x,y location called for by the scan converter 24 during the write operation of the read/modify/write cycle of BIM 38. In this way, the data stored in each location of the BIM 38 represents the history of the echo returns at the corresponding location in the scanned region. The data is modified in a way that echo returns from objects at locations which have produced returns over a number of scans (i.e. typically target returns) are displayed with a characteristic (i.e. color or intensity) different from returns from objects which have produced returns over a single scan or from a scan-to-scan in a random manner which would be typically clutter returns. More particularly, clutter returns may be negated by the display or shown with a low intensity or particular color and a fade in one scan out of a number of scans of echos from a target echo return may remained displayed even though such fade has occurred. Further, target "build-up" and decay may be simulated. In any event, the function of data modification and storing is interleaved with video read-out for display, maximizing the time efficiency of memory management. More particularly, when the BIM 38 is addressed by the display controller 28 to read the modified data $Z_n'(x,y)$ as to display 26 presents visual display of the modified data $Z_n'(x,y)$ on the screen 25. The BIM 38 is addressed by the scan converter 24 during the period of time the visual display 25 completes display of a portion of the modified data and before it commences display of the succeeding portion of modified data. The scan converter 24 thus updates the data in each individual pixel in the rectangular raster once, and generally only once, per antenna revolution. Thus, the address control of the multiplexer 42 is synchronized with the horizontal synchronization pulse fed to display 26 via line SYNC in a manner to be described in detail in connection with FIGS. 14A to 14G. It should be noted that a buffer and digital-to-analog (D/A) section 46 converts the parallel data read out of the BIM 38 to serial digital data which is converted to analog data for the display 26. The buffer and D/A section 46 is inhibited during the horizontal scan retrace.

Referring now to FIGS. 3A-9A, the modification of data provided by the data modification section 28, and more particularly to a ROM 40 in such section 28, will now be discussed. It is first postulated that a target echo return is a return which is confirmed on the next scan whereas a clutter return is not confirmed on the next scan. Perhaps it might be helpful to consider the effect of data modification on six types of echo returns at a specific x,y location: (1) low level (or weak) clutter as shown in FIG. 3A (that is an echo return which goes from a zero level to a one level, 1, and then returns to zero after one antenna revolution, i.e. scan; (2) high level (or strong) clutter as shown in FIG. 4A; that is, an echo return which goes from zero to 2 to zero after one antenna revolution (scan); (3) a long duration, low level target return, as shown in FIG. 5A; that is, an echo return which goes from a zero level to a 1 level for a N number of scans (where N is greater than 2) and then returns to zero; (4) a long duration high level target return, as shown in FIG. 6A; that is, a return which goes from zero to a 2 level for N scans (where N is greater that 2) and then returns to zero, (5) a short duration, low level target return, as shown in FIG. 7A where the return is the same as in (3) above except N=2; and, (6) a short duration, high level target return, as shown in FIG. 8A where the return is the same as in (4) above but with N=2.

As noted above, it is desirable to present on the rectangular raster display a number of desirable characteristics typically associated with PPI displays. These characteristics are: (1) build up of target echos over one or more scans similar to the build up of intensity on a PPI display; (2) controlled decay of target returns over several scans similar to the fades in intensity on a PPI display; and (3) present trails on moving targets. Thus, here, rather than display the Z(x,y) scan-to-scan time history shown in FIGS. 3A, 4A, 5A and 6A as produced at the output of the scan converter 24, the intensity Z(x,y) produced by the scan converter is modified in the modification section 28 to Z'(x,y) prior to being displayed. The modification is implemented in a read-only memory (ROM) 40. The ROM 40 modification is to effect the following: (1) scan-to-scan correlation; that is radar returns not occurring on two successive scans, that is not persisting for a complete antenna revolution are either suppressed or displayed at a low intensity level or in a different color; (2) controlled build-up of targets, for instance fast build up to a maximum level commensurate with the input signal level; (3) controlled decay of targets over several scans; and, (4) selection of different rates of build up and/or decay as a function of target amplitude, for instance fast decay on noncorrelating targets, but slow decay on strong targets. In order to understand the operation of the data modification section 28, a specific example will herein be described. ROM 40 stores the desired new $Z'_n(x,y)$ in response to $Z(x,y)$ and $Z'_{(n-1)}(x,y)$ (where $Z_n(x,y)$ is the intensity level of the return during the current scan of the antenna; $Z'_{(n-1)}(x,y)$ is the intensity level stored in BIM 38 i.e. the intensity of the prior return history; and $Z'_n(x,y)$ is the modification intensity being stored in the BIM 38 as a result of the modification). Thus, the relationship between the data inputs and the data outputs of ROM 40 for this example may be represented as (where the data is presented in base 2 notation):

TABLE I

| $Z_n(x,y)$ | $Z'_{(n-1)}(x,y)$ | $Z'_n(x,y)$ |
|---|---|---|
| 00 | 00 | 00 |
| 00 | 01 | 00 |
| 00 | 10 | 01 |
| 00 | 11 | 10 |
| 01 | 00 | 01 |
| 01 | 01 | 10 |
| 01 | 10 | 11 |
| 01 | 11 | 11 |
| 10 | 00 | 01 |
| 10 | 01 | 10 |
| 10 | 10 | 11 |
| 10 | 11 | 11 |

FIGS. 3B to 8B illustrate the effect of the data modification of ROM 40 programmed as shown in TABLE I on the returns shown in FIGS. 3A to 8A, respectively. Thus, in comparing FIG. 3A with 3B, it is noted that the low level clutter return is, in effect, unmodified. In comparing the high level clutter return (FIG. 4A) with the modification return (FIG. 4B), it is evident that the data modification has the effect of showing strong clutter with a greater intensity than weak clutter (FIG. 3B) but the strong clutter has diminishing intensity since such return appears in a second scan, albeit with a reduced intensity (or different color). Comparing an unmodified long duration, low level target return (FIG. 5A) with a modified long duration, low level target return (FIG. 5B), it is first noted that here there is a build-up in intensity (or color changes) over the first three antenna scans similar to the build-up effect on intensity in a CRT, PPI display. Further, on the scan after the Nth scan, the intensity goes progressively lower over the next three scans to present the persistence effect of a PPI display. Here again, the intensity increase or effect may be displayed with color changes. The effect of data modification on short duration, low level and high level targets is shown in comparing FIGS. 7A and 8A with FIG. 7B and FIG. 8B, respectively. Here again, there is a build-up in intensity (or color change) and a target trail. Finally, the effect of a target fade is illustrated in comparing FIG. 9A and FIG. 9B. Here, a low level target has a fade (here a null) in the fourth scan, as shown in FIG. 9A; however, such null does not appear in the modified return, as shown in FIG. 9B but has merely a slight change in intensity similar to the effect on an analog PPI display.

The data stored in ROM 40 and as shown in TABLE I is illustrated in FIG. 10. The vertical axis serves as the output of BIM 38, $Z'_{(n-1)}(x,y)$ (i.e. the input to ROM 40) and the output of the ROM 40, $Z'_n(x,y)$. The horizontal axis presents the scan number. The numerals adjacent the line segments are the input intensity levels $Z_n(x,y)$. Thus: segment AB is 1; segments BC, CD, DE and EF are either 1 or 2; segment AF is 2; and segments BJ, FK, KL, CM, MN, GF, GH, HI, DP, PQ and QR are zero. Thus, for example, consider the high duration, high level target condition of FIG. 6A. The start point is always A. From FIG. 6A, the input to the ROM 40 from the video collect i.e. $Z_n(x,y)$ is 2. Hence, we move from point A to point F of segment AF and the output of ROM 40 is $(10)_2=2$ for scan 1 as shown in FIG. 6B. From FIG. 6A, it is next observed that on scan 2, the intensity Z(x,y) remains at 2 hence we move to point E on segment FE and ROM 40 produces at its output $(11)_2$ or 3, as shown in FIG. 6B. Thus, 3 is the maximum level and since the target return remains at the highest level, the output of ROM 40 will not change and hence we move to point D until a decrease in level is detected.

Here, the level drops to zero at the high scan and hence we move from point D to point P along segment DP and ROM 40 produces a $(10)_2$ or 2 output, as shown in FIG. 6B at scan (N−1). Since the target does not reappear, we move from point Q (output 1) on scan N to point P (output 00)$_2$ at R. Thus, considering FIGS. 3A and 3B from FIG. 10, it is evident that one moves from point A to point B to point J. With FIGS. 4A to 4B, one moves from point A to point F to point K to point L. Considering FIGS. 5A and 5B, one moves from point A to point B to point C to point D and remains at point D until the trail at which one moves from point D to point P to point Q to point R. Finally, considering FIGS. 9A and 9B, one moves from point A to point B to point C to point D and remains at point D until scan 4 when next, one moves to point P then back to point D and remains at point D until the trail from point D to point P to point Q to point R.

Another program which might be stored in ROM 40 is the following (where data is presented in base 2 notation):

TABLE II

| $Z_n(x,y)$ | $Z'_{(n-1)}(x,y)$ | $Z'_n(x,y)$ |
|---|---|---|
| 00 | 00 | 00 |
| 00 | 01 | 00 |
| 00 | 10 | 01 |
| 00 | 11 | 10 |
| 01 | 00 | 01 |
| 01 | 01 | 10 |
| 01 | 10 | 11 |
| 01 | 11 | 11 |
| 10 | 00 | 10 |
| 10 | 01 | 10 |
| 10 | 10 | 11 |
| 10 | 11 | 11 |

Such program in TABLE II is illustrated in FIG. 11. Here, both low level and high level clutter appear unmodified. Both low level and high level targets build up after three scans. However, a one scan null in a strong target will not result in a change in the display.

Figure 12A:
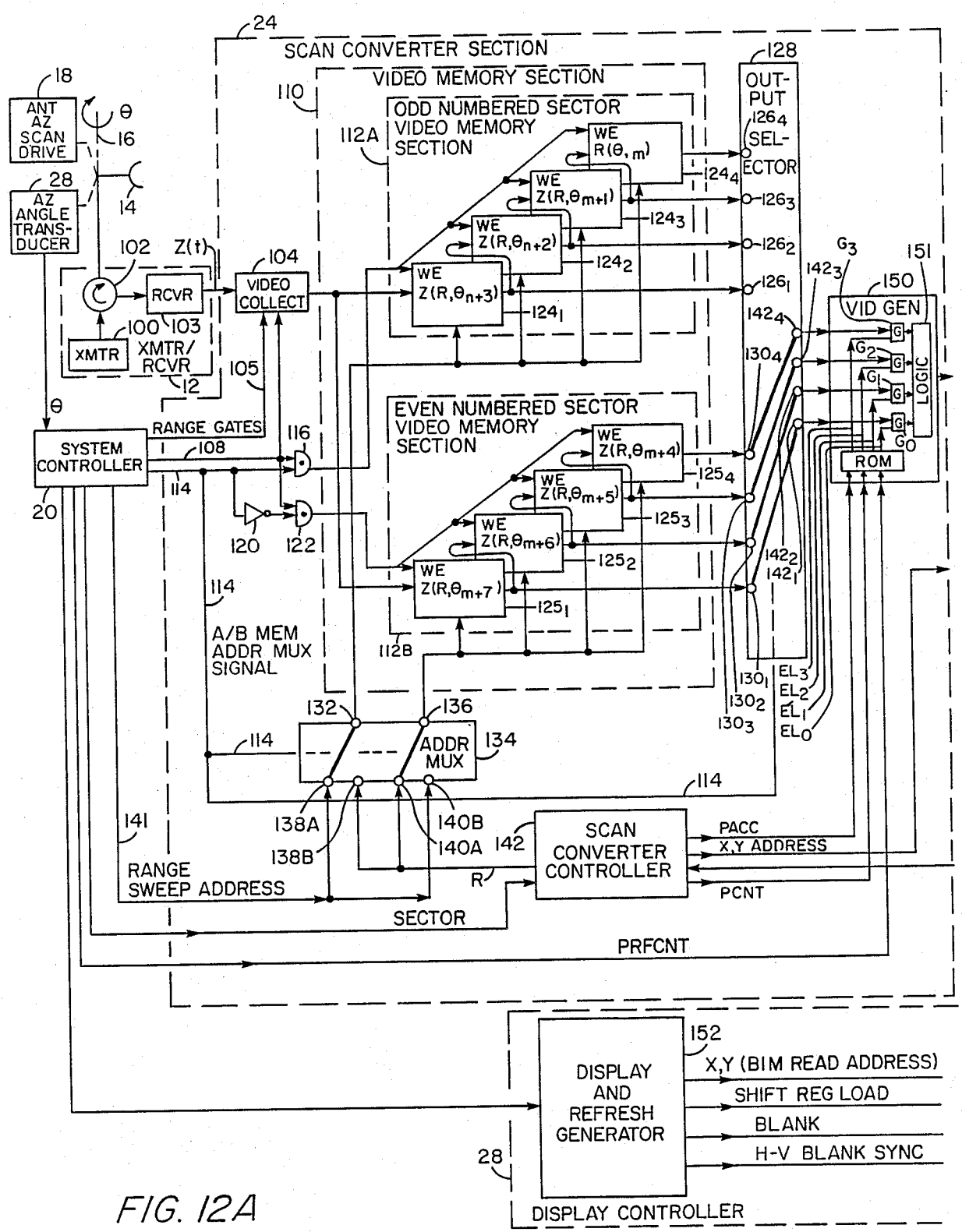
FIGS. 12A and 12B are arranged to make up a more detailed block diagram of the marine radar system shown in FIG. 1.
Figures 12, 12B:
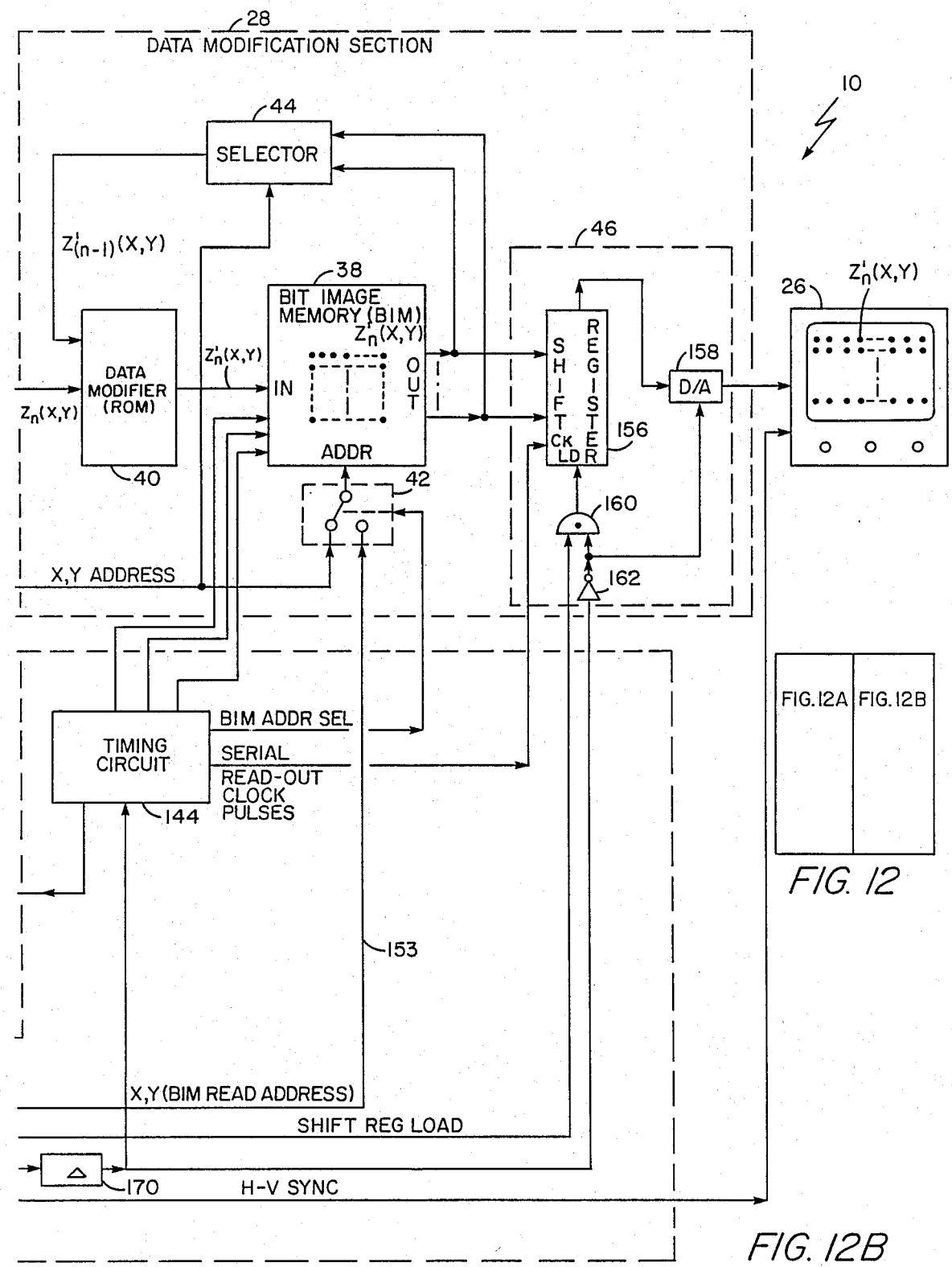
FIG. 12 is a sketch showing how
Figure 13:
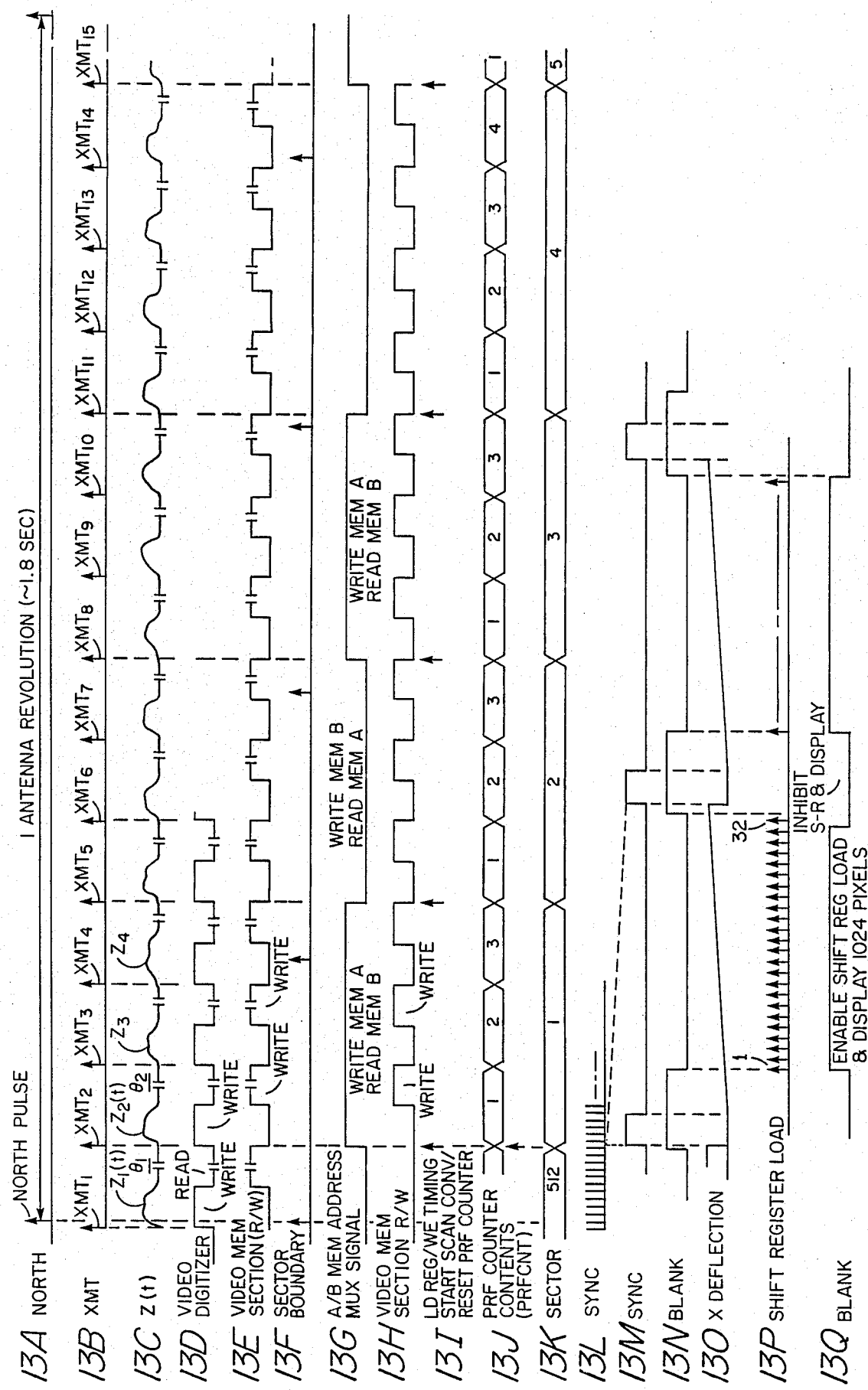
FIGS. 13A-13Q are time histories of various signals processed by the radar system of FIG. 12 and which are useful in understanding the operation of such radar system.

Referring now to FIG. 12, the radar system 10 is shown in more detail. Thus, the transmitter/receiver 12 is shown in more detail to include: a transmitter 100 coupled to antenna 14 via circulator (or T-R switch) 102 to transmit pulses of radio frequency energy in response to internally produced trigger pulses XMT (FIG. 13B); and, a receiver 103 coupled to the output of circulator 102, as shown, to produce a video, analog range sweep Z(t) in response to each transmitted pulse, as shown in FIG. 13C. Thus, range sweeps $Z_1(t)$, $Z_2(t)$ ... are produced in response to transmit pulses $XMT_1$, $XMT_2$ ... respectively, and such range sweeps are associated with objects at different ranges (R) but which are at azimuth angles $\theta_1$, $\theta_2$, $\theta_3$,..., respectively since the transmitted pulses $XMT_1$, $XMT_2$ ... were produced when the antenna 14 was angularly positioned in azimuth at angles $\theta_1$, $\theta_2$, $\theta_3$, respectively. Further, as the antenna azimuth scan drive motor 18 rotates antenna 14 about axis 16, each time antenna 14 passes through a reference angle, here north, a pulse is produced by transducer 27, as shown in FIG. 13A, in addition to the normal antenna position incremental pulses (not shown) indicating azimuth $\theta$. Hence, a north pulse is produced once every revolution; under nominal operating conditions, once every 1.8 seconds, as shown in FIG. 13A. As noted above, the rotation of the antenna 14 and the operation of the system controller 20 are not synchronized one with the other with the result that transmitted pulses XMT (FIG. 13B) are not synchronized with north pulses (FIG. 13A). The analog video range sweeps $Z_1(t)$, $Z_2(t)$ ... are fed to video collect section 104 of the scan converter 24. The video collect section 104 includes a conventional analog-to-digital converter and real time memory (not shown). In response to range cell sample pulses on line 105 produced by the system controller 20 and synchronized with the transmitted pulses XMT, the echo returns at predetermined range cells are converted to two-level binary signals. The absence of a return is designated as a 0, a low level return is designated as a 1, and a high level return is designated as a 2. Thus, the output of the video collect has two lines or channels. A least significant bit (LSB) line which is a logic 1 for a low level return, otherwise it is logical 0; and, a most significant bit (MSB) line which is a logical 1 if the return is a high level return, otherwise it is a logical 0. The data on the LSB line and the MSB line are thus digitized range cell data. The digitized range cell data is stored in the real time memory of the video collect section 104 in response to a read/write signal supplied to the video collect section 104 by the system controller 20. The read/write signal is fed to the video control section 104 via line 108 and the read/write signal on such line is shown in FIG. 13D. Thus, the real time memory (not shown) in the video collect section 104 is placed in a write mode shortly after a transmit pulse and after the last digitized range cell data is written into such memory it is placed in a read mode with the stored data then being written into a video memory section 110 of the scan converter 24. The video memory section 110 includes two memory subsections 112A, 112B. The inputs of both subsections 112A, 112B are fed by the output of the video collect 104, as indicated. However, when one of the sub-sections 112A, 112B is placed in the write enable condition, the other subsection is placed in the write disable or read condition (FIG. 12E). As noted briefly above, the basic operating cycle of the scan converter 24 is the "sector" and as noted briefly above, each revolution of the antenna 14 is divided into, here 512 regularly spaced angular sectors. Therefore, the pulse repetition frequency PRF) of the transmitter 100 is 900 Hz and since the antenna rotates on a nominal rate of 33 rpm, there will be an average of 3.2 range sweeps per sector. The first sector occurs when the antenna 14 is directed north and each time the antenna 14 rotates through a boundary of a sector, a sector boundary pulse is produced by the system controller 20. The boundary sector pulses are shown in FIG. 13F. Referring again to the operation of the memory subsections: sections 112A, 112B, memory subsections operate so that first one of the memory subsections stores data from the video collect 104 as the antenna 14 is scanning through one of the 512 sectors, then the other one of the memory subsections stores data from the video collect 104 as the antenna 14 scans through the next sector; the data stored from the previous sector scan being available for reading from the first memory subsection. Thus, for example, here memory subsection 112A stores data as the antenna scans the first sector after "north" and subsection 112B stores data as the antenna scans through the next sector; however, data stored in subsection 112A is read and scan converted while the antenna is scanning the second (i.e. next) subsection i.e. as the subsection 112B is storing data.

Referring to FIG. 12G, an A/B memory address signal on line 114 is shown which changes from "high"

to "low" or from a "low" to "high" in response to the next transmit trigger pulse XMT after a sector boundary pulse (FIG. 12F). Thus, here the memory subsections 112A, 112B alternate in read/write modes at transmit trigger pulses XMT2, XMT5, XMT8, XMT11, and XMT15, as shown. The signal on line 114 is gated with the read/write signal on line 108 in AND gate 116 to produce write enable pulses for section 112A (FIG. 12H). The signal on line 114 is fed via inverter 120 to an AND gate 122. Also fed to AND gate 122 is the signal on line 108 to produce write enable pulses for section 112B, as shown in FIG. 12I. Thus it follows that section 112A will store the first three range sweeps i.e. those of the first sector $Z_1(R,\theta)$, $Z_2(R,\theta)$ $Z_3(R,\theta)$ and then section 112B will store the next three range sweeps $Z_4(R,\theta)$, $Z_5(R,\theta)$, $Z_6(R,\theta)$ i.e. those in the second sector. It is noted in the illustration that there are three range sweeps in the third sector but four range sweeps in the fourth sector. As noted above, there will be an average of 3.2 sweeps per sector and some sectors will have three sweeps and others will have four sweeps. Each of the memory subsections 112A, 112B has four identical random access (RAM) sections $124_1$–$124_4$, $125_1$–$125_4$, respectively, as shown to store each of the up to four range sweeps in a sector. The outputs of memory sections $124_1$–$124_4$ are fed to a first set of four inputs $126_1$–$126_4$, respectively, of outut selector 128 and the output sections $125_1$–$125_4$ are fed to a second one of four inputs $130_1$–$130_4$, respectively, of output selector 128. It is noted that while the input to section $124_1$ is fed by the output of video collect section 104, the inputs of sections $124_2$–$124_4$ are fed by the outputs of sections $124_1$–$124_3$, respectively, as shown. Similarly, while the input to section $125_1$ is by the output of video collect memory 104, the inputs of sections of $125_2$–$125_4$ are fed by the outputs sections $125_1$–$125_3$, respectively, as shown. Address terminals of sections $124_1$–$124_4$ are coupled to the first output 132 of address multiplexer 134 and address terminals of sections $125_1$–$125_4$ are coupled to the second output 136 of multiplexer 134, as shown. Multiplexer 134, in response to the A/B address multiplexer signal on line 114 (FIG. 13G) couples terminal 132 to either terminal 138A or 138B and simultaneously therewith couples terminal 136 to either terminal 140A or 140B; it is noted, however, that when the terminal 132 is coupled to terminal 138A, terminal 136 is coupled to terminal 140A (as shown) and when terminal 132 is coupled to terminal 138B, terminal 136 is coupled to terminal 140B. Terminals 138A and 140B are fed a range cell address signal supplied by system controller 20 via line 141 and are synchronized with each transmit pulse. Terminals 138B, 140A are fed range addresses by a scan converter controller 142. Thus, in operation, when data is being written into section 112A, range cell addresses to section $124_1$–$124_4$ are supplied by the system controller 20 and data stored in sections 112B is being read from sections $125_1$–$125_4$ by addresses supplied by the scan converter controller 142. Further, output selector 128 is also controlled by the signal on line 114 so that when data is being written into section 112A, the data read by sections $125_1$–$125_4$ passes to the output terminal $142_1$–$142_4$, respectively, as indicated and conversely, when data is being written into sections $125_1$–$125_4$ and read from sectins $124_1$–$124_4$, such read data appears on terminals $142_1$–$142_4$, respectively. It follows thus that in referring to FIGS. 13A–13H, after the first four transmit pulses XMT1–XMT4, the first three range sweeps $Z_2(R,\theta)$, –$Z_4(R,\theta)$, after the sector boundary pulse becomes stored in sections $124_3$–$124_1$, respectively. More particularly, as the system controller successively produces range addresses $R_1$–$R_{max}$, the range cells of the first full current range sweep $Z_2(R,\theta)$, are stored in successive locations $R_1$–$R_{max}$ of memory section $124_1$ during the write cycle (FIG. 13D). The system controller 20 then successively produces range cells $R_1$–$R_{max}$ during the write cycle (FIG. 13E) and as such addresses are fed to all sections $124_1$–$124_4$, the range cells of the then second full range sweep $Z_3(R,\theta)$ are stored in the locations $R_1$–$R_{max}$ of section $124_1$ and the range cells with the first four range sweeps of $Z_1,(R,\theta)$ are transferred to locations $R_1$–$R_{max}$ of section $124_2$. The process continues and thus when the range cells from sweeps in the even numbered sectors starting from north (see FIG. 13C) are being written into section 112A; range cell data from sweeps in the odd numbered sectors are being read from section 112B and conversely when range cell data from sweeps in the even numbered sectors are being written into section 112B, range cell data from sweeps in the odd numbered sectors are being read from section 112A. In either case, data read from either section 112A, 112B appear at the output of output selector 128.

Figure 15:
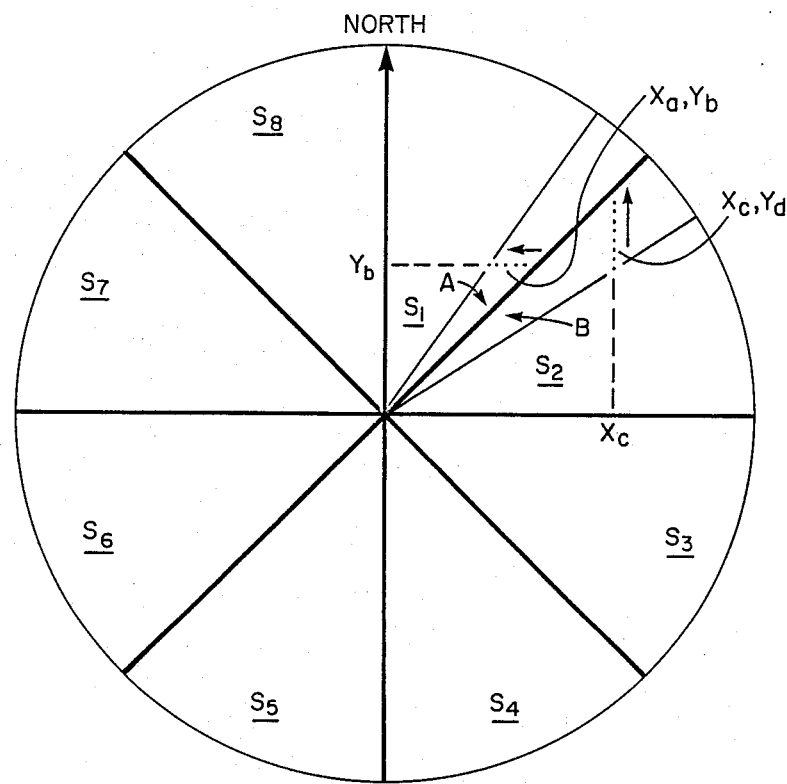
FIG. 15 is a diagram depicting the octant segmentation of a region scanned by the radar system in FIG. 1 and which is useful in understanding the scan converter controller section of the radar system shown in FIG. 12.

Referring now to FIG. 12, the details of the data modification section 28 and the display controller 29 will be discussed. Thus, as noted above, when data is being written, the addresses are supplied by range cell address data from the system controller 20; however, when data is being read from either section 112A, 112B, the addresses are supplied by the scan converter controller 142. The scan converter controller 142 is fed the sector information by the system controller 20 as shown in FIG. 13K. The number of sweeps in the previous sector, PRFCNT (see FIG. 13J) is fed to the video generators 150 from the system controller 20. In response to such data and to timing pulses fed to it via timing circuit 144 of display controller 28, the scan controller 142 addresses each x, y location in BIM 38 disposed within the sector currently being processed (i.e. converted from polar to rectangular coordinates). Therefore, for each x, y address produced by the scan converter controller 142 (such address being fed to address BIM 38 via mux 42) a range is computed, such range being the one of the ranges closest to the selected x, y location. One such scan converter controller is described in U.S. patent application Ser. No. 325,448, filed Nov. 27, 1981, entitled "PPI to Raster Display Scan Converter", inventor Gerald P. Richards, and assigned to the same assignee as the present invention. Thus, in FIG. 2C, such range would be the range $R_a$. The scan converter next determines the number of x, y locations in the row of x, y locations being converted and the location within the sector of the next x, y location to be addressed. This calculated data appears on lines PACC and PCNT, respectively and such data is fed to video generator 150 along with: (1) the data from the addressed range in the sweeps of the sector being converted; and, (2) the number of sweeps (PRFCNT) collected during the last sector as determined by the system controller 20. The video generator 150 responds to such data determines an approximation for the echo return intensity at the x, y location addressed by the scan converter 142. That is, the intensity Z(x, y) and such is fed as the input to the data modification section 28 as described above. Here, however, the scan converter controller described in such patent application is preferably modified to provide, in addition to the range closest to the selected x, y position and the x, y position itself, the following: (a) the number of x, y positions in a row (or column) being converted (i.e. PACC) and (b) the row (or column) location in the sector of the x, y position being converted (i.e. PCNT). Referring also to FIG. 15, the 360° of scan region is shown divided into eight octants, $S_1$–$S_8$. Each octant has a number of sectors. Thus, after passing through north, the radar scans sequentially through octants $S_1$–$S_8$. In converting data obtained from the sectors in octants $S_1$, $S_4$, $S_5$ and $S_8$, the scan conversion takes place on a row-by-row basis starting at the row closest to the origin and progressing outwardly to the outer perimeter of the scanned region as described in the above-identified patent application. Here, however, when converting data from sectors in octants $S_2$, $S_3$, $S_6$ and $S_7$, rather than the conversion taking place on a row-by-row basis as described in the above-identified patent application, the conversion takes place on a column-by-column basis starting at the column closest to the origin and progressing outwardly to the outer perimeter of the scanned region. For example, in FIG. 15 an exemplary one of the sectors in octant $S_1$ is designated as region A and a particular pixel location in such sector is designated as $X_a$, $Y_b$, such pixel being disposed in a row at $Y_b$. In converting such $X_a$, $Y_b$ location "PACC" refers to the number of x, y locations in row $Y_b$ in sector A and "PCNT" refers, as indicated, to the position of the $X_a$, $Y_a$ location in such sector. Thus here, as illustrated, in converting the pixel at location $X_a$, $Y_b$, PACC is 5 and PCNT is 3. Further, in converting the sectors in octants $S_1$, $S_4$, $S_5$ and $S_8$, "PACC" is equal to the difference between the X-start address accumulator and the X-end address accumulator described in such patent application. The data PCNT is available from the X increment counter described in such patent application. Referring to octant $S_2$, an exemplary one of the sectors in such octant $S_2$ is designated as region B. As noted above, the conversion process in octant $S_2$ is on a column-by-column basis. Thus, in converting an exemplary location $X_c$, $Y_d$, which is disposed in a column at location $X_c$, "PACC" refers to the number of locations in the sector B disposed along the column at $X_c$ and PCNT refers to the position of the location of $X_c$, $Y_d$ along such row. Thus here, as illustrated, in converting the pixel at location $X_c$, $Y_d$, PACC is 8 and PCNT is 3. Further, in addition to the x and y start accumulators described in the patent application, an Y-start accumulator and Y-end accumulator would be required. The additional Y-start accumulator and Y-end accumulator would be fed by the same signal as that fed to the X-start accumulator and X-end accumulator. However, the Y-start accumulator and Y-end accumulator would be enabled when converting sectors in octants $S_2$, $S_3$, $S_6$ and $S_7$ and the X-start accumualtor and X-end accumulator would be enabled when converting sectors in octants $S_1$, $S_4$, $S_5$ and $S_8$. Thus in converting the sectors in octants $S_2$, $S_3$, $S_6$ and $S_7$, PCNT is equal to the difference between the Y-start address accumulator and the Y-end address accumulator. The data PACC would be available in the Y increment counter when converting sectors in octants $S_2$, $S_3$, $S_6$ and $S_7$.

Figure 16:
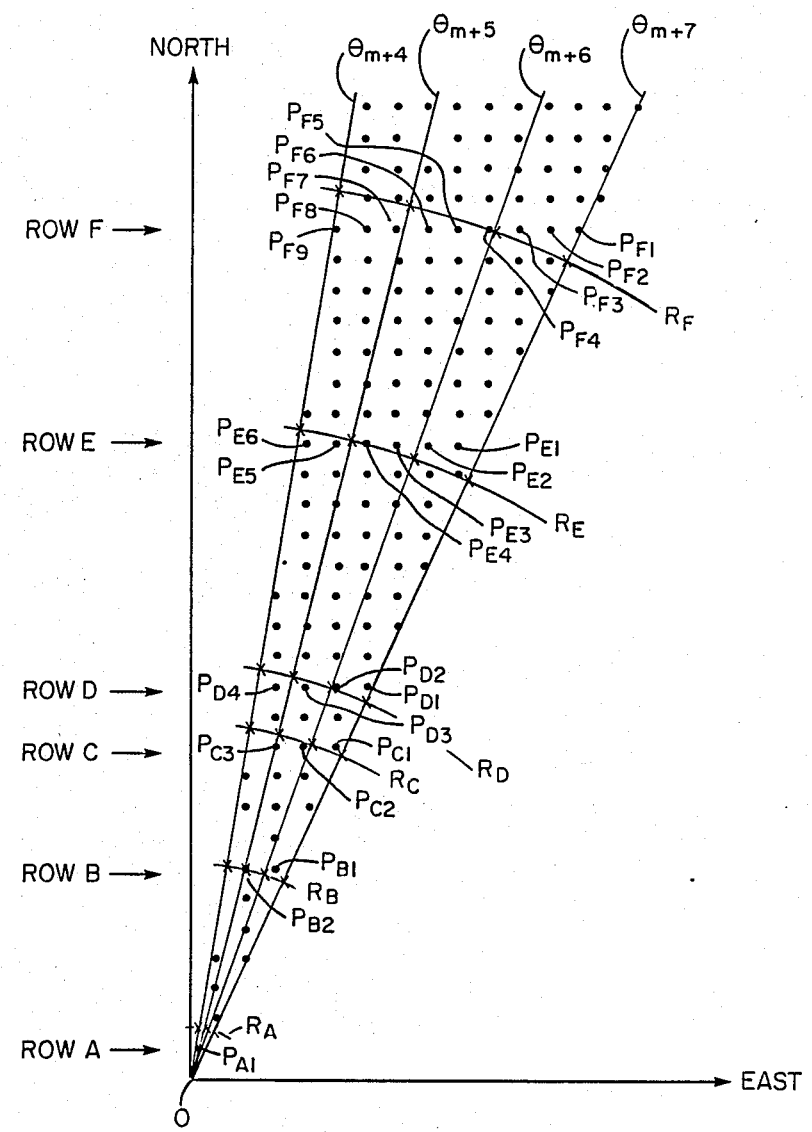
FIG. 16 is a diagram useful in understanding the algorithm used in a video generator section of the radar system shown in FIG. 12.

Considering next the details of the video genertor 150, it is first noted that such video generator 150 includes four selector gates $G_0$–$G_3$. The selector gates $G_0$–$G_3$ are coupled to terminals $142_1$–$142_4$, respectively, as shown. Further, the selector gates $G_0$–$G_3$ are also coupled to enable lines $EL_0$–$EL_3$, respectively, as shown. When enable line $EL_0$ is "high", the data on terminal $142_1$ passes through selector gate $G_0$ to a logic network 151, the output of such logic network 151 being fed to data modifier (ROM) 40, as shown. Conversely, when enable line $EL_0$ is "low", the data on terminal $142_1$ is inhibited from passing through selector gate $G_0$ to the logic network 151. The selector gates $G_1$–$G_3$ operate in a similar manner and hence only when the enable signal on line $EL_1$ is "high" will the data on terminal $142_2$ pass through selector gate $G_1$; only when the enable signal on line $EL_2$ is "high" will the data on terminal $142_3$ pass through selector gate $G_2$; and finally, only when the enable signal on line $EL_3$ is "high" will the data on terminal $142_4$ pass through selector gate $G_3$. The "high" or "low" signals on enable lines $EL_0$–$EL_3$ are produced in accordance with an algorithm stored in a read-only memory (ROM). The inputs to the ROM are on lines PACC, PCNT, PRFCNT produced by the scan converter controller 142 and the system controller 20. The algorithm may be better understood by considering specific examples and referring also to FIG. 16. In the example shown in FIG. 16, PRFCNT (i.e. the number of sweeps in the sector shown in FIG. 16) is four (it being understood that, as discussed above, PRFCNT can be either three or four). Here, the four sweeps are shown illustratively at angles $\theta_{n+4}$, $\theta_{n+5}$, $\theta_{n+6}$ and $\theta_{n+7}$. Thus, the radar returns from these sweeps are stored in the memories $125_1$–$125_4$, respectively (FIG. 12). The radar return data (taken at ranges R) are designated by the symbol "X". The x, y locations (i.e. pixels) are designated by the symbol ".". as shown. Thus, it is noted that near the origin O (i.e. at the shorter ranges) the number of sweeps is greater than the number of pixels in each row of pixels, whereas at the larger ranges the number of pixels per row is much greater than the number of sweeps in the sector. The effect of the video generator 150 may be stated that, in general, when the number of sweeps (i.e. PRFCNT, here four) is less than the number of pixels in a row thereof (i.e. PACC), as for example at the larger ranges, the data used for each pixel in the row being converted is the return taken at the nearest range, azimuth to such pixel. Thus, for example, the data used to determine $Z_{PF4}(x, y)$ for pixel $P_{F4}$ is the data at range $R_F$, $\theta_{(n+6)}$. When the number of sweeps is higher than the number of pixels in a row being converted, but less that double the number of pixels, as at relatively short ranges, the greatest (i.e. more intense) return from the returns at the closest range and closest azimuths to such pixel is used to determine $Z(x, y)$ for such pixel. That is, the logic network 151 produces an output representative of the greatest of the two returns. Thus, for example, for pixel $P_{C2}$ the larger of the return at range $R_c$, $\theta_{(m+6)}$ and range $R_c$, $\theta_{(m+7)}$ is used to determine $Z_{PC2}(x, y)$. Thus, for example, in the first case described above for pixel $P_{F4}$, the scan converter controller 142 (FIG. 12) determines the range closest to pixel $P_{F14}$, i.e. range $R_F$ and addresses memories $125_1$–$125_4$ at such range $R_F$. Also, the ROM in the video generator 150 decodes the signals on lines PRFCNT (here four), PACC (here nine since there are here nine pixels in the same row as pixel $P_{F4}$), and PCNT (here four since here pixel $P_{F4}$ is the fourth pixel in the row counting from the most recent sweep (i.e. the sweep at the angle $\theta_{(m+7)}$). The decoded signal is here one which makes enable line $EL_1$ "high" and enable lines $EL_0$, $EL_2$ and $EL_3$ "low" so that only the return $Z(R_F, \theta_{m+6})$ (i.e. the data at terminal $130_2$) passes to the data modifier 40 (ROM) as $Z_n(x, y)$. Likewise, in the second example considered above, i.e. for pixel $P_{C2}$: PRFCNT is here again four; PCNT is here two; and PACC is here three. Thus, the scan converter controller 142 determines the closest range, here $R_C$, and addresses memories $125_1$-$125_4$ at such range, $R_C$, and in response to the signals on lines PRFCNT, PACC and PCNT, the ROM of video generator 150 produces "high" signals on both enable line $EL_1$ and enable line $EL_2$ while producing "low" signals on both enable lines $EL_0$ and enable line $EL_3$ with the result that $Z(R_c, \theta_{(m+6)})$ and $Z(R_c, \theta_{(m+5)})$ pass to logic network 151 and the one thereof with the greatest intensity passes the data modifier (ROM) 40 as $Z_n(x, y)$.

In the general case, in converting any row of pixels (or column of pixels when such conversion is done on the column-by-column basis discussed above) the pixel closest to the most recent sweep is converted first, as noted in the two specific examples above. The number of selector gates $G_0$-$G_3$ to be enabled vary from one gate network to four gate networks. Let the selector gates $G_0$-$G_3$ be ordered from a lowest order gate, here gate $G_0$, to a highest order gate, here gate $G_3$. Thus, the selector gates $G_0$-$G_3$ may be considered as consecutively ordered from $G_0$ to $G_1$ to $G_2$ to $G_3$. To determine the selector gate or selector gates to be enabled, a calculation is made of the lowest whole integer of [(PRFCNT)(PCNT)/(PACC)]−0.1 for the first pixel to be converted in any row (or column) thereof. The integer calculated provides the subscript for the highest ordered selector gate to be enabled. Further, the lowest order selector gate to be enabled for the first pixel being converted in a row is gate $G_0$ while the lowest ordered gate to be enabled for a succeeding pixel being converted is the highest ordered gate of the preceeding converted pixel. To best understand the foregoing, some specific examples will be described: Consider the pixel in row A, i.e. the pixel $P_1$. This row contains only one pixel. Thus, here PRFCNT is four; PACC is one; and PCNT is one. Since this is the first pixel being converted in the row, the lowest ordered gate $G_0$ is enabled. The calculation [(PRFCNT)(PCNT)/(PACC)−0.1] is here [(4)(1)/(1)]−0.1=3.9; and the lowest whole integer of 3.9 is 3. Thus, the subscript of the highest ordered gate to be enabled is selector gate $G_3$. Thus, selector gates from $G_0$ (i.e. the lowest order gate) to $G_3$ (i.e. the highest order gate) (i.e. selector gates $G_0$, $G_1$, $G_2$ and $G_3$) are enabled. Next consider conversion of the pixels in row B. Here PRFCNT is four; and, PACC is 2. Thus, in converting the first pixel in row B, i.e. pixel $P_{B1}$, the subscript of the highest ordered gate network to be enabled is the lowest whole integer of [(4)(1)/(2)]−0.1 or here, 1. Thus, selector gates $G_0$ and $G_1$ are enabled. In converting the next pixel in row B, (i.e. pixel $P_{B2}$), the lowest ordered gate to be enabled is the highest ordered gate enabled in converting the preceeding pixel (i.e. pixel $P_{B1}$), here gate $G_1$. The highest order gate to be enabled is gate network $G_3$. Thus, to convert pixel $P_{B2}$, selector gates from the lowest ordered gate ($G_1$) to the highest ordered gate ($G_3$) (i.e. the gates $G_1$, $G_2$ and $G_3$) are enabled. A little thought will make it apparent that in converting pixels $P_{C1}$, $P_{C2}$ and $P_{C3}$ in row C: selector gates $G_0$ and $G_1$ are enabled for pixel $P_{C2}$; and selector gates $G_2$ and $G_3$ are enabled for pixel $P_{C3}$. Similarly, for rows D, E and F, the table below indicates the selector gates to be enabled:

TABLE III

| row | pixel | selector gate (or gates) enabled |
|-----|-------|----------------------------------|
| D | $P_{D1}$ | $G_0$ |
| D | $P_{D2}$ | $G_0$ and $G_1$ |
| D | $P_{D3}$ | $G_1$ and $G_2$ |
| D | $P_{D4}$ | $G_2$ and $G_3$ |
| E | $P_{E1}$ | $G_0$ |
| E | $P_{E2}$ | $G_0$ and $G_1$ |
| E | $P_{E3}$ | $G_1$ |
| E | $P_{E4}$ | $G_1$ and $G_2$ |
| E | $P_{E5}$ | $G_2$ and $G_3$ |
| E | $P_{E6}$ | $G_3$ |
| F | $P_{F1}$ | $G_0$ |
| F | $P_{F2}$ | $G_0$ |
| F | $P_{F3}$ | $G_0$ and $G_1$ |
| F | $P_{F4}$ | $G_1$ |
| F | $P_{F5}$ | $G_1$ and $G_2$ |
| F | $P_{F6}$ | $G_2$ |
| F | $P_{F7}$ | $G_2$ and $G_3$ |
| F | $P_{F8}$ | $G_3$ |
| F | $P_{F9}$ | $G_3$ |

Thus, is is evident that for each one of the pixels a determination can be made "a priori" of the selector gate or gates $G_0$-$G_3$ to be enabled in the conversion process. This "a priori" determinated data is stored in the ROM of video generator 150 to enable rapid, pixel-by-pixel, scan conversion.

As noted above, the operation of the data modification section 28 is controlled by the display controller 29 and more particularly to display and refresh generator 152 here manufactured by Nippon NEC Electronics USA, Inc., Model No. $\mu$PD7220. It is here noted that the refresh of BIM 38 has been not discussed since refresh of a dynamic N-MOS RAM is well known in the art. The display and refresh generator 152 produces a train of vertical sync pulses (not shown) and horizontal sync pulses as shown in FIG. 13L and, in more detail in a time expanded scale in FIG. 13M. (It is noted that the graphs of FIGS. 13M-13Q are shown with the same time expanded scale). The composite horizontal and vertical sync pulses are fed to the display 26 via SYNC line, as discussed briefly above. The display and refresh generator 152 also produces a conventional blank pulse for each horizontal sync pulse as shown in FIG. 13M. As is well known in the art, the blank pulses start before the sync pulse and terminates after the termination of the sync pulse to inhibit display of transients in each row raster start-stop transition. As shown in FIG. 13O and as is also well known in the art, the X-deflection voltage of the display 26 starts at the termination of the sync pulse linearly increasing in level to a maximum at the end of the sync pulse where it returns to zero, as shown. During the time interval between blank pulses i.e. as a row is being displayed, a corresponding row of locations in BIM 38 is read and the data in such locations are displayed pixel by pixel on the displayed row. More particularly, the buffer and D/A section 46 is shown in detail to include a parallel-in/serial-out shift register section 156, the input being adapted to receive from the output of BIM 38, 32, parallel two-bit digital words and to load such 32 words in response to a load signal fed to the LD terminal of such shift register section 156. The output of the shift register section 156 is adapted to serially read out such 32 words in response to clock pulses fed to the CK terminals thereof, said serially read words being fed to the display 26 via D/A 158. In response to the D/A 158, the intensity (or color) of the display is changed in accordance with the intensity level of the D/A converted signal. The blank signal is fed to the AND gate 160 and the D/A inhibited via inverter 162 as shown. Also fed to the AND gate 160 are shift register load pulses produced by the display and refresh generator 152 and shown in FIG. 13P. Here 32 shift register load pulses are produced during the period of time between blank pulses. Thus, a total of 1024 two-bit words are loaded into the shift register 156 and are serially read therefrom between blank pulses and as a row of the display is being scanned one word per pixel for such scanned row. It is noted that the blank signal produced by the inverter 162 is fed to the inhibit terminal of D/A 158 and to the AND gate 160 to inhibit loading of the shift register 156 and to inhibit D/A conversion of data at the output of the shift register 156 (i.e. produces zero or blank level at the D/A 158 output).

Figure 14:
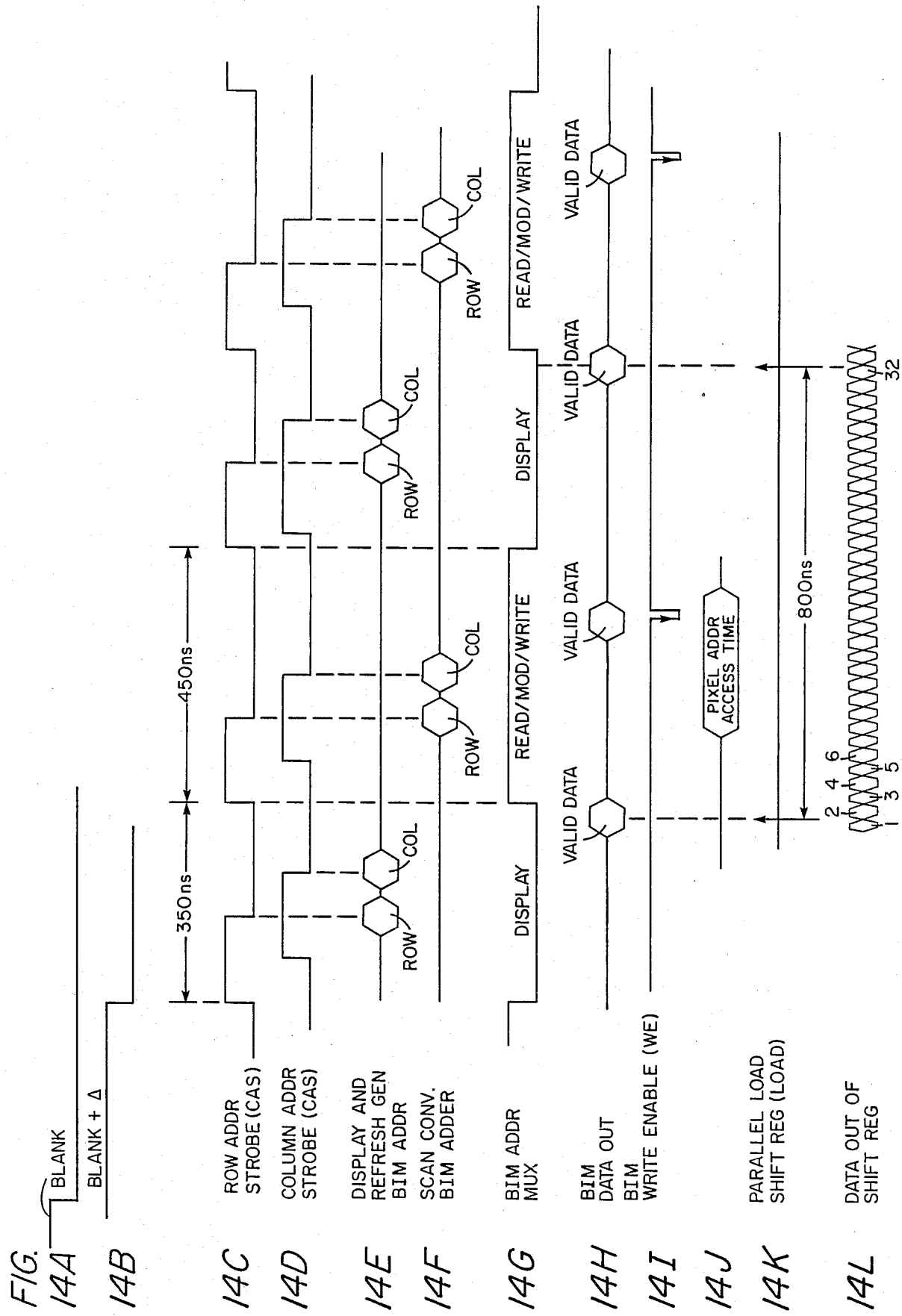
FIGS. 14A-14L are time histories of signals used to control the operation of the data modification section of the radar system shown in FIG. 12.

To understand in more detail the read/modify/write operation of BIM 38, reference is made to FIGS. 14A–14L which show in FIG. 14A the falling edge (i.e. terminal edge) of the blank pulse such FIGS. 14A–14L being on a greatly expanded time scale from FIGS. 13M–13O). The read/modify/write operation, that is the address control for the multiplexer 42 and clock pulses fed to the shift register 146 are controlled by timing circuit 144. As noted in FIG. 12, the blank pulses pass through a time delay network 170 for reasons to become apparent (FIGS. 14A, 14B). Suffice it to say here, however, that the time delay produced by network 170 is here about 325 nanoseconds and is used to account for the time delay required to first read data from BIM 38 prior to such data being loaded into the shift register 156. Further, such time between blank pulses is here 25.6 microseconds and since the shift register is loaded during this 25.6 microseconds i.e. once every 800 ns, as shown in FIGS. 13M–13P, the relatively short 335 nanosecond delay has not been discussed above and was not reflected in FIGS. 13M–13P. Here, however, in connection with FIGS. 14A–14L, the 335 ns delay is considered. Thus, in response to the trailing edge of the delayed the blank pulse (FIG. 14B) 32 cycles each of 800 ns commences. Each one of the 800 ns cycles is made up of two period portions; a first 350 ns period and then a 450 ns period, as shown in FIG. 14C. During the first 350 ns period timing circuit 128 produces a control signal for multiplexer 42 (FIG. 14G) to couple to the address terminal of BIM 38 the x,y address supplied by the display in refresh generator 152; and, during the next 450 ns period, such control signal couples the address terminals of BIM 38 to scan converter controller 142 via multiplexer 42. During the first 150 ns, a row address strobe (RAS) signal is fed to the BIM 38 by timing circuit 128 (FIG. 14C) and a similar 150 ns column address strobe (CAS) signal is fed, after a suitable delay, (here 75 ns). During the trail edge of the RAS signal "a row" address is supplied to the BIM 38 by the generator 152 and during the trailing edge of the CAS signal the "column" address is supplied to the BIM 38 by generator 152 (FIG. 14E). Thus, valid data is read from BIM 38 in response to the x,y addresses supplied by generator 152 via line 153. Thus, the reason for 325 ns delay network 171. Since during this time, the blank pulses "low" (FIG. 13M), the output of inverter 162 is "high" (FIG. 13Q); and, gate 160 is enabled to thereby enable loading of the shift register 156 with the 32, two-bit digital words at the address supplied by the display generator 152 (FIGS. 14K–14L). During the next 450 ns of the 800 ns cycle, as noted above, the address row fed to BIM 38 is from the scan converter controller 142. A RAS signal and a CAS signal is fed to BIM 38, as shown in FIGS. 14C and 14D with row and column address being supplied by the scan converter controller at the trailing edge of the signals as shown in FIG. 14F. Valid data is read from the BIM 38 of the address location after about 350 ns into the 400 ns period and at each time a write enable pulse is fed to BIM 38 from the timing circuit 128, as shown in FIG. 13I, so that: (1) 32, two-bit digital words are read out of BIM 38; (2) these 32 words are fed to selector 44; (3) selector 44 responds to the lower order bits of the address supplied by the scan converter controller 142 to pass only one of the 32 words; i.e. one of the words corresponding to the location being supplied by the scan converter 24 (i.e. $Z'_{n-1}(x,y)$) and such word is fed to the data modification section 40 along with the output of the video generator 150 i.e. $Z_n(x,y)$; and, (4) the output of the data modification section 40 i.e. $Z'_n(x,y)$ (i.e. the modified data) becomes written into BIM 38 at the same location which is addressed by the scan converter controller 142. Thus, data in the location of BIM 38 are modified once every 800 ns.

Finally referring to FIGS. 13K and 13L, during the time between shift register load pulses (FIG. 13K) the 32 words are serially read from the shift register 156 at a 40 MHz rate, thus, 32 words are read each 800 ns. Therefore, as shown in FIGS. 12 and 13Q, during the period of time during blank pulses (FIG. 12M) approximately 1024 pixels are serially read from the shift register 156 as the X-deflection is scanned across a row of the display (FIG. 12).

Figure 17:
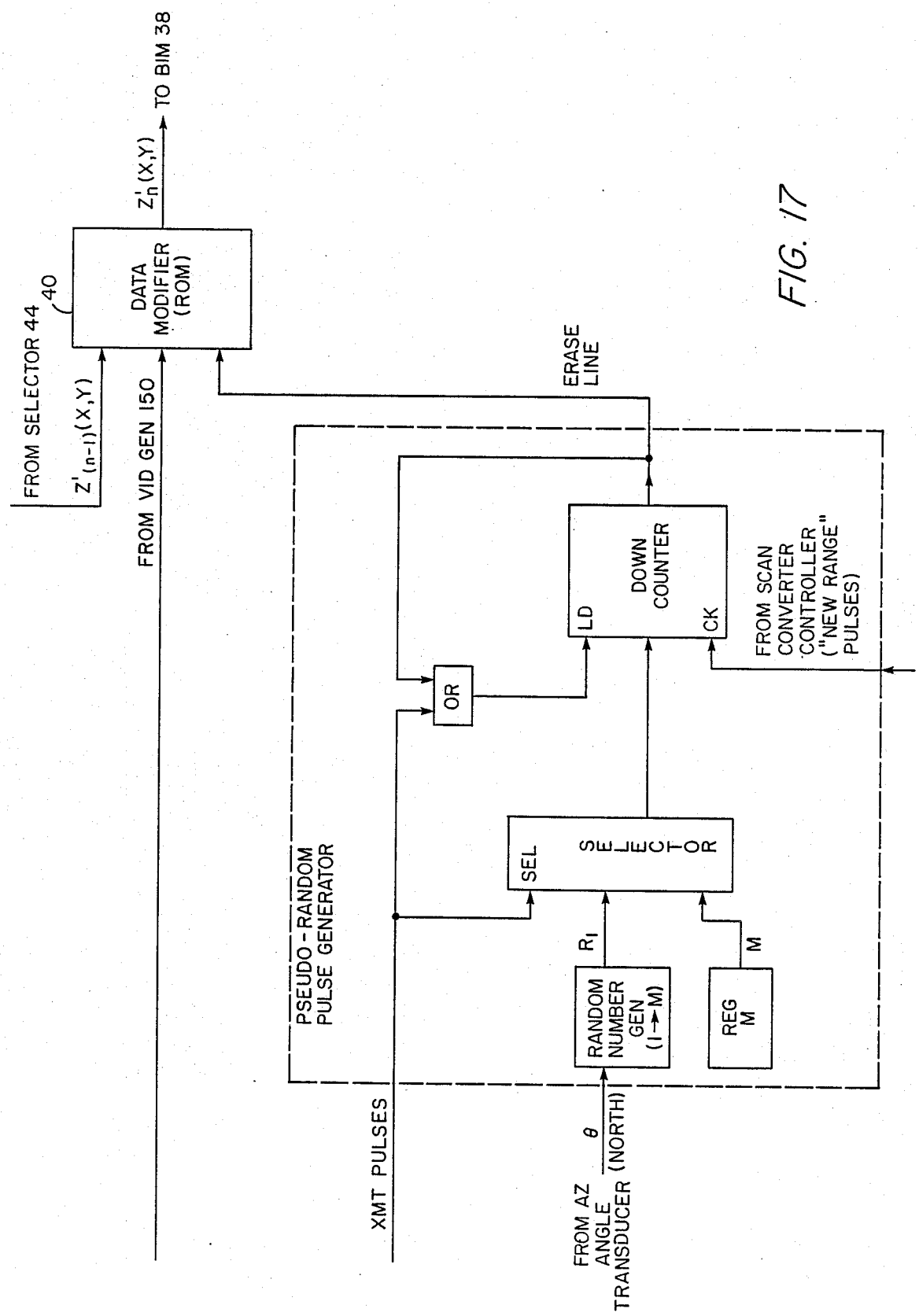
FIG. 17 is an alternative embodiment of a data modification section which may be used in the marine radar system of FIG. 1.

Referring now to FIG. 17, an alternative embodiment of the data modification section 28 is shown. Here, an additional input to the data modifier 40 (ROM) is a signal fed thereto from a pseudo-random pulse generator. The pseudo-random pulse generator produces either a logical 1 signal or a logical 0 signal on the ERASE LINE as determined by the pseudo-random pulse generator in a manner to be described. The effect of the alternative embodiment is to enhance the generation of target trails. More specifically, in accordance with the embodiment described above, a target trail may be generated; however, such trail is, with the technique described above, of relatively short time duration. In some applications, however, it is desired that the trail of a target be displayed for longer periods of time; up to, in some applications, displaying the target as the target progresses from one position on the display screen until the target progresses off of the display screen. To enhance the target trail in accordance with the alternative embodiment of the invention, the data modifier (ROM) 40 may be considered as storing two algorithms: one algorithm being used when there is no erase pulse on the ERASE LINE, (that is when the pulse produced by the pseudo-random pulse generator is a logical 0); and, another algorithm is used when the pseudo-random pulse generator produces an erase pulse on the ERASE LINE, (that is a logical 1 signal). These two algorithms are shown in FIGS. 18A and 18B. The algorithm shown in FIG. 18A being that used when there is no erase pulse (that is when the pseudo-random pulse generator produces a logical 0 signal) and the algorithm used when there is an erase pulse (that is when the pseudo-random pulse generator produces a logical 1) being shown in FIG. 18B. To understand the effect of these new algorithms, let us consider the algorithm shown in FIG. 18A, that is the algorithm which is used in the absence of an erase pulse. It is noted that with such algorithm here there would be a target build-up after a number of scans and that such target would be displayed indefinitely thereafter. Thus, for example, if a target appeared on the screen, as the target moved across the screen, there would be a paint brush effect made on the screen and the target would smear across the screen as it moved its position progressively off the screen. However, a pseudo-random pulse is generated so that the algorithm in FIG. 18B is used in addition to the algorithm in FIG. 18A. Thus considering the algorithm shown in FIG. 18B, that is the algorithm used in the presence of an erase pulse, it is noted that in the absence of new data fed from the video generator 150 (FIG. 12A), i.e. when $Z(x,y)=1$ or 2, the data at an addressed pixel is erased. The pseudo-random pulse generator, which is shown in detail in FIG. 17, is arranged to erase a predetermined number of pixels per scan. A number of pixels to be erased being a function of the desired trail time duration. The greater the number of pixels to be erased per scan would result in a relatively short trail and the lower the number of pixels to be erased, the longer the trail. For example, at one extreme if no pixels are erased, a smear would be produced across the screen and at the other extreme, it there is an erase pulse everytime data is modified by the data modifier, there would not be any trail (it being noted that the erase pulse has no effect on new data (i.e. data from the video generator 150) but only on modified data $Z'_{(n-1)}(x,y)$ from selector 44.

Referring now also to FIG. 19, wherein an arbitrary range sweep at angle $\theta$ is shown, radar returns are shown at range $R_1$, $R_1+M$, $R_1+2M$ and so forth. The value of $R_1$ is randomly selected by random number generator $R_1$ shown in FIG. 17 and a random number from 1 to M (here 1 to 16) is selected each time the antenna passes through north. A preset value of M (equal to the maximum of $R_1$, here 16) is stored in a register M. The random number generator $R_1$ and the register M are fed as inputs to a selector. In the presence of a transmit pulse XMT the selector selects as the output thereof, $R_1$, while in the absence of such pulse XMT, the selector produces at the output thereof the output M. Thus, in response to a transmit pulse, the random number generator has the output thereof coupled to a down counter. The transmit pulse couples through an OR gate to load the down counter with the contents of the random number generator $R_1$, here 1-16. Each time a new range is selected by the scan converter controller, the down counter is fed a pulse to its clock input, CK, and such down counter counts down one. When the output thereof reaches 0, an erase pulse is produced by the output of the down counter. Such erase pulse passes to the data modifier 40 and also passes through the OR gate to now load the down counter with the M input. Thus, for example, let us consider the following time sequence: The antenna passes through north and a subsequent transmit pulse $XMT_1$ is transmitted. The random number generator $R_1$ in this example stores the number 3 (i.e. and only selected between 1 and M) which becomes stored in the down counter. The scan converter controller then addresses these ranges ($R_1$, $R_2$ and $R_3$) and at the end of the third addressed range, the down counter goes to 0 so that an erase pulse is genreated. In response to this erase pulse, which is fed to the data modifier 40 (ROM), the contents in the register become loaded into the down counter. As noted above, here such contents is 16. Thus, the number 16 becomes loaded into the down counter. The scan converter controller then addresses sixteen ranges ($R_4$, $R_5$ ... $R_{19}$). At this time the down counter is counted down from 16 to 0 producing a new erase pulse. The number 16 again becomes loaded into the down counter so that again after every 16 ranges an erase pulse is produced. The process continues until the next transmit pulse $XMT_2$ is produced. The random number generator now stores therein 3 then 16. The process continues until the antenna passes through north which resets the random number generator at which time a new number between 1 and 16, excluding 3, is selected. In this way, before any one of the pixels is called out for an erase pulse, the other pixels in the display may have been called out at least once. Further, as noted above, the number of pixels to be erased is a function of the desired trail time duration. Thus, the larger the number M, the longer the trail duration and, on the other hand, the smaller the number M, the shorter the trail time duration.

Having described a preferred embodiment of the invention, other embodiments incorporating these concepts will now become apparent to those of skill in the art. For example, the apparatus may be modified so that the data modification section allows for selection of different rates of build up and/or decay for different categories of PPI data, for instance slow decay on radar returns and fast decay on range rings or electronic bearing lines; generation of trails of desired color or intensity on target above a certain amplitude; selection of a different mix of desirable characteristics as a function of the operational environment or as a function of the range selection by the operator; and selection of a different mix of characteristics for different areas on the display surface. It is felt, therefore, that this invention should not be restricted to the preferred embodiment but rather should be limited only by the spirit and scope of the appended claims.

What is claimed is:

1. Apparatus for displaying data on a display in a raster format, such data representing echo returns obtained in a polar coordinate format comprising:
   (a) a scan converter means, fed by the echo returns in polar coordinates for converting the data in polar coordinates to data levels representative of the echo return levels in rectangular coordinates;
   (b) a bit image memory means for storing data levels fed thereto and for providing the data levels stored therein to the display when such stored data levels are read from the bit image memory means, the data levels stored therein representing levels of echo returns to be displayed in raster format;
   (c) a read-only memory means, addressed by the scan converter data levels and the bit image memory mean data levels read from the bit image memory means, for storing a plurality of display data levels at addressable locations of such read-only memory means, the display data level stored in the read-only memory means being greater than the bit image memory means data level addressing such read-only memory means when the scan converter data level addressing the read-only memory means is the same as the bit image memory means data level addressing the read-only memory means, data levels read from the read-only memory means being fed as data levels for storage in the bit image memory means; and
   (d) a pseudo-random pulse generator connected to provide an additional address to the read-only memory means.

* * * * *